(12) United States Patent
Arata et al.

(10) Patent No.: US 11,472,321 B2
(45) Date of Patent: Oct. 18, 2022

(54) VEHICLE SEAT

(71) Applicant: TACHI-S CO., LTD., Tokyo (JP)

(72) Inventors: Kazuyoshi Arata, Tokyo (JP); Takumi Yamakawa, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 17/378,254

(22) Filed: Jul. 16, 2021

(65) Prior Publication Data
US 2021/0339663 A1     Nov. 4, 2021

Related U.S. Application Data

(62) Division of application No. 16/703,011, filed on Dec. 4, 2019, now Pat. No. 11,247,589.

(30) Foreign Application Priority Data

Dec. 19, 2018 (JP) .............................. JP2018-237303
Mar. 28, 2019 (JP) .............................. JP2019-063694

(51) Int. Cl.
    *B60N 2/56*       (2006.01)
    *B60N 2/22*       (2006.01)
    *B60H 1/00*       (2006.01)
    *B60N 2/70*       (2006.01)

(52) U.S. Cl.
    CPC ......... *B60N 2/5657* (2013.01); *B60N 2/2222* (2013.01); *B60N 2/5642* (2013.01); *B60H 1/00285* (2013.01); *B60N 2/5635* (2013.01); *B60N 2/7094* (2013.01)

(58) Field of Classification Search
    CPC .. B60N 2/5642; B60N 2/5657; B60N 2/7082; B60N 2/914
    See application file for complete search history.

(56) References Cited

U.S. PATENT DOCUMENTS

| 10,076,981 | B2 * | 9/2018 | Dry ..................... B60N 2/646 |
| 2003/0102699 | A1 | 6/2003 | Aoki et al. |
| 2010/0327636 | A1 | 12/2010 | Stoll et al. |
| 2011/0109128 | A1 | 5/2011 | Axakov et al. |
| 2014/0333101 | A1 | 11/2014 | Stoll et al. |
| 2017/0080838 | A1 | 3/2017 | Dry |

FOREIGN PATENT DOCUMENTS

| DE | 102010050772 A1 | 7/2011 |
| JP | H04-082511 A | 3/1992 |
| JP | 2003-165325 A | 6/2003 |
| JP | 2010-142646 A | 7/2010 |
| JP | 2012-105816 A | 6/2012 |

OTHER PUBLICATIONS

May 31, 2022, Japanese Office Action issued for related JP Application No. 2019-063694.

* cited by examiner

*Primary Examiner* — Syed A Islam
(74) *Attorney, Agent, or Firm* — Paratus Law Group, PLLC

(57) ABSTRACT

A vehicle seat includes: a chamber in which at least a seat-front-surface side is covered with a pad and which circulates the air blown from a front surface of a seat through the pad; a fan configured to send air into the chamber; and a support body which supports the chamber so as to be able to sink in an acting direction of a load applied to the surface of the seat. The chamber includes a first region and a second region, and the first region and the second region are configured to allow subduction of the chamber independently of each other.

8 Claims, 19 Drawing Sheets

101A

VEHICLE SEAT

CROSS-REFERENCE TO RELATED APPLICATION(S)

This application is a divisional of U.S. patent application Ser. No. 16/703,011 filed on Dec. 4, 2019, which claims the benefit of priority from Japanese Patent Application No. 2018-237303, filed on Dec. 19, 2018, and Japanese Patent Application No. 2019-063694, filed on Mar. 28, 2019, the entire contents of which are incorporated herein by reference.

BACKGROUND

1. Field of the Invention

The present invention relates to a vehicle seat.

2. Description of the Related Art

A seat cushion of a seat installed in a vehicle such as an automobile includes a pad and a frame which supports the pad. The frame typically includes a pair of side frames, a front frame and a rear frame connecting the pair of side frames, and a plurality of springs suspended between the front frame and the rear frame. Also known is an air conditioning seat which further includes a chamber covered with a pad and a fan sending air into the chamber and blows air from a surface of the seat cushion through the pad (see JP-A-2003-165325 and JP-A-2012-105816, for example).

The load applied to a rear side of the seat cushion which supports the buttocks of a seated person is greater than the load applied to a front side of the seat cushion which supports the thighs of the seated person. Whereas the pad is supported by the front frame on the front side of the seat cushion, the pad is supported by the plurality of springs on the rear side of the seat cushion where a relatively great load is applied. For this reason, the rear side of the seat cushion sinks below rather than the front part side of the seat cushion.

The chamber provided in the air conditioning seat described in JP-A-2003-165325 and JP-A-2012-105816 is relatively rigid. Due to a difference in the amount of sedimentation between the front and rear sides of the seat cushion, the chamber pivots around the front frame. As a result, the front portion of the chamber is lifted and the thighs of a seated person are pressed, and thus sitting comfort may be reduced.

In the seat described in JP-A-2003-165325, the air flow path is formed by a cushion pad. In this case, the cushion pad is deformed when the weight of an occupant is loaded and the air flow path is crushed due to the deformation of the cushion pad, and thus there is a possibility that the air flow is delayed.

On the contrary, in the seat described in JP-A-2015-105816, the air flow path is formed by a duct made of a resin tubular member. In this case, the air flow path is maintained even when the weight of an occupant is loaded. However, the presence of a rigid chamber such as a duct inside the cushion pad may impair sitting comfort. For example, in the seat cushion, when an occupant puts weight on one of the left and right sides, one side of the chamber sinks, but due to the rigidity of the chamber, the other side of the chamber may be lifted and the other side of the occupant may be pushed up by the chamber.

SUMMARY

The invention has been made in view of the circumstances described above and an object thereof is to provide a vehicle seat which can enhance seating comfort of a vehicle seat including a chamber for air conditioning.

According to an aspect of the invention, there is provided a vehicle seat, including: a chamber in which at least a seat-front-surface side is covered with a pad and which circulates the air blown from a front surface of a seat through the pad; a fan configured to send air into the chamber; and a support body which supports the chamber so as to be able to sink in an acting direction of a load applied to the surface of the seat, wherein: the chamber includes a first region and a second region; and the first region and the second region are configured to allow subduction of the chamber independently of each other.

According to another aspect of the invention, there is provided a vehicle seat, including: a chamber in which at least a seat-front-surface side is covered with a pad and which circulates the air blown from a front surface of a seat through the pad; a fan which sends air into the chamber; and a support body which supports the chamber so as to be able to sink in an acting direction of a load applied to the surface of the seat, wherein: the chamber includes: a first region located on one side in a seat width direction; and a second region located on the other side in the seat width direction; and the first region and the second region are configured to bend and deform independently of each other in the acting direction of the load.

According to a still another aspect of the invention, there is provided a vehicle seat, including: a chamber in which at least a seat-cushion-front-surface side is covered with a pad and which circulates the air blown from a front surface of a seat cushion through the pad; a fan which sends air into the chamber; and a support body which supports the chamber so as to be able to sink in an acting direction of a load applied to the front surface of the seat cushion, wherein: the chamber includes: a front region located on a front portion of the seat cushion; and a rear region located on a rear portion of the seat cushion; and the front region and the rear region are configured to bend and deform independently of each other in the acting direction of the load.

According to a still another aspect of the invention, there is provided a vehicle seat, including: a chamber in which at least a seat-back-front-surface side is covered with a pad and which circulates the air blown from a front surface of a seat back through the pad; a fan which sends air into the chamber; and a support body which supports the chamber so as to be able to sink in an acting direction of a load applied to the front surface of the seat back, wherein: the chamber includes: an upper region located on an upper portion of the seat back; and a lower region located on a lower portion of the seat back; and the upper region and the lower region can bend and deform independently of each other in the acting direction of the load.

According to a still another aspect of the invention, there is provided a vehicle seat, including: a chamber in which at least a front-surface side of a seat cushion is covered with a pad and which circulates the air blown from a surface of the seat cushion through the pad; a fan which sends air into the chamber; and a frame which supports the pad and the chamber, wherein: the frame includes: a front frame disposed below the pad and the chamber on a front side of the seat cushion; and a plurality of springs disposed below the pad and the chamber on a rear side of the seat cushion; and the chamber includes: a front chamber disposed on the front side of the seat cushion; a rear chamber disposed on the rear side of the seat cushion; and a first movable portion which is provided between the front chamber and the rear chamber and allows the rear chamber to sink with regard to the front chamber.

According to the invention, the seating comfort of a vehicle seat including a chamber for air conditioning can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
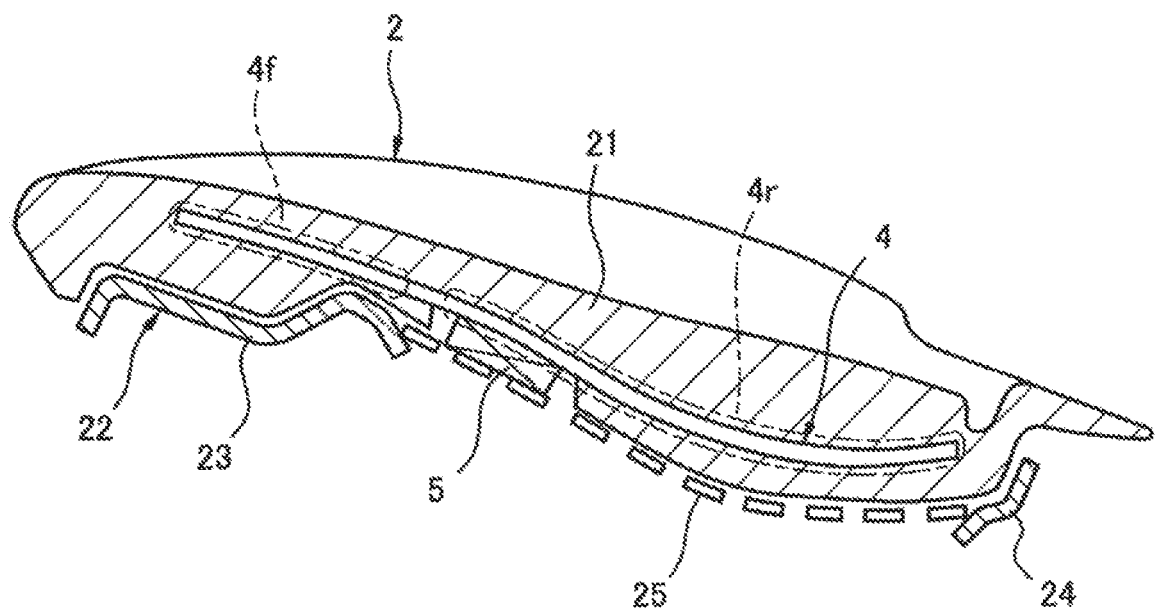
FIG. 1 is a cross-sectional view of an example of a seat cushion of a vehicle seat for explaining an embodiment of the invention.

FIG. 1 illustrates an example of a vehicle seat for explaining an embodiment of the invention.

A vehicle seat (hereinafter also simply referred to as a seat) 1 illustrated in FIG. 1 is a seat installed in a vehicle such as an automobile, for example. The seat 1 includes a seat cushion 2 which supports the buttocks and thighs of an occupant seated on a seat and a seat back (not illustrated) which supports the waist and back of the occupant.

The seat cushion 2 includes a pad 21 made of a foam material such as urethane foam, a chamber 4, a fan 5 for sending air into the chamber 4, and a frame 22 which supports the pad 21 and the chamber 4. The air sent into the chamber 4 by the fan 5 flows inside the chamber 4 and is blown out from the surface of the seat cushion 2 through the pad 21 which covers a seat-cushion-front-surface-side of the chamber 4. By blowing air from the surface of the seat cushion 2, the temperature and humidity of the surface of the seat cushion 2 in contact with an occupant are adjusted. The pad 21 is covered with a trim cover made of leather, woven fabric, non-woven fabric, knitted fabric, or the like, and among those, when the trim cover is made of leather, the trim cover is provided with a large number of air holes and the air permeability of the trim cover is ensured.

The frame 22 includes a pair of side frames (not illustrated), a front frame 23 and a rear frame 24 which connect the pair of side frames, and a plurality of springs 25 which are suspended between the front frame 23 and the rear frame 24. The spring 25 is a metal wire member bent into a wave shape and a planar shape. The chamber 4 includes a front region 4f disposed in the front portion of the seat cushion which supports the thighs of an occupant and a rear region 4r disposed in the rear portion of the seat cushion which supports the buttocks of the occupant. The front frame 23 is disposed below the front region 4f of the chamber 4 and the springs 25 are disposed below the rear region 4r of the chamber 4.

The back surface of the chamber 4, which is the surface on an opposite side to the seat-cushion-front-surface side, is covered with the pad 21. The front region 4f of the chamber 4 is supported by the front frame 23 via the pad 21 which covers the back surface of the chamber 4. The rear region 4r of the chamber 4 is supported by the springs 25 via the pad 21 which covers the back surface of the chamber 4. When a load of an occupant is applied to the seat cushion 2, the front region 4f of the chamber 4 sinks with the compression of the pad 21. The rear region 4r of the chamber 4 sinks with the deflection of the springs 25 in addition to the compression of the pad 21. From the viewpoint of suppressing an increase in the thickness of the seat cushion 2 associated with the installation of the chamber 4, it is preferable that the back surface of the rear region 4r of the chamber 4 is exposed.

In an example illustrated in FIG. 1, a part of the back surface of the chamber 4 is exposed and the fan 5 is directly attached to the exposed back surface of the chamber 4. However, the attachment location of the fan 5 is not particularly limited. The fan 5 may be connected to the chamber 4 via a tube. In this case, the fan 5 may be attached to the front frame 23 or the rear frame 24, for example.

Figure 2:
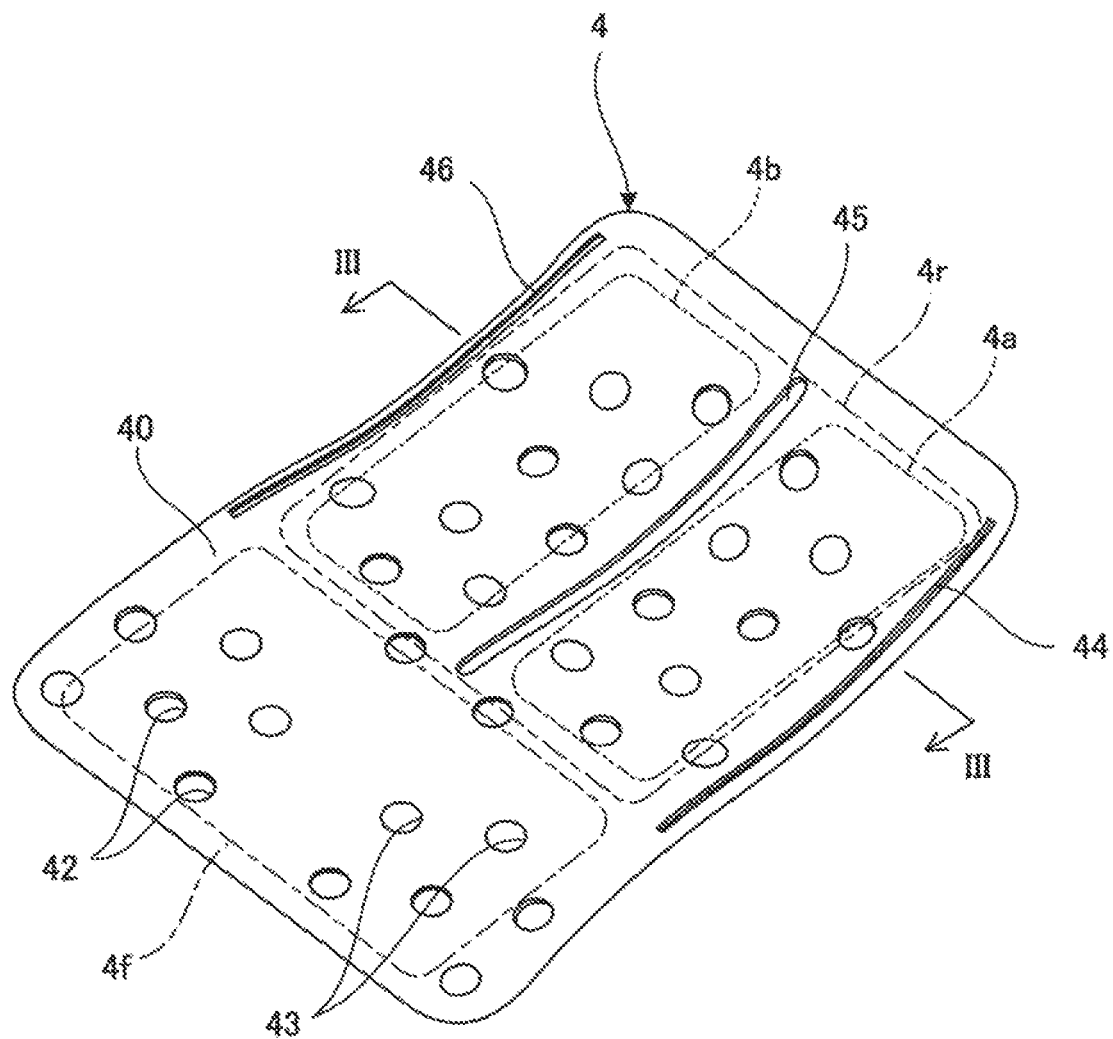
FIG. 2 is a perspective view of an example of a chamber of FIG. 1.
Figure 3:
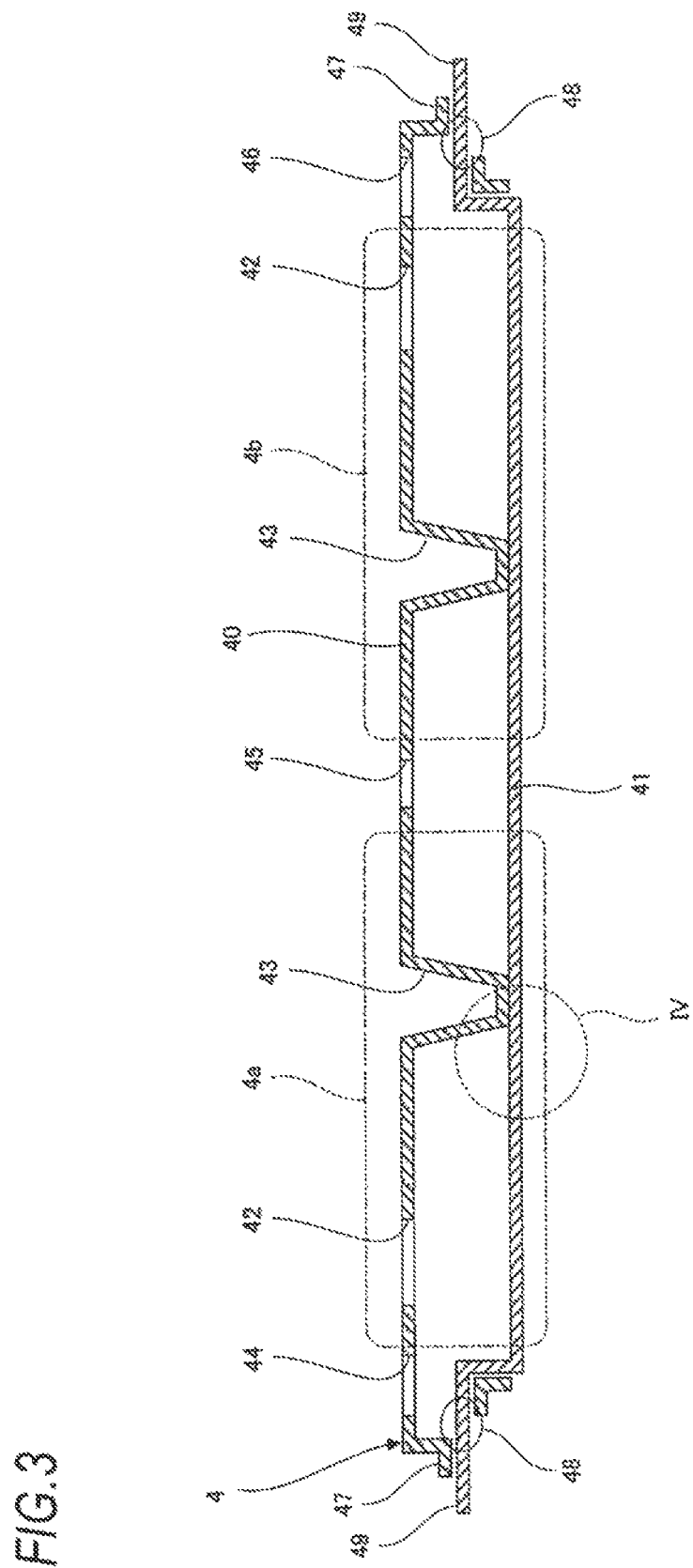
FIG. 3 is a cross-sectional view of the chamber of FIG. 2 taken along the line III-III.

FIGS. 2 and 3 illustrate an example of the chamber 4.

The chamber 4 illustrated in FIGS. 2 and 3 includes a first member 40 disposed on the seat-cushion-front-surface side and a second member 41 disposed on the seat-cushion-rear-surface side. The first member 40 and the second member 41 are plate-like members made of a resin material such as polypropylene, for example. The first member 40 and the second member 41 are combined to form an air circulation space between the first member 40 and the second member 41.

The first member 40 disposed on the seat-cushion-front-surface side is provided with a plurality of air holes 42. The air flowing through the circulation space is blown out from the air hole 42 and blown out from the surface of the seat cushion 2 through the pad 21 covering the seat-cushion-surface side of the chamber 4.

A boss is provided on at least one of the first member 40 and the second member 41 so that the circulation space is maintained even when a load of an occupant is applied to the seat cushion 2. In an example illustrated in FIGS. 2 and 3, a plurality of bosses 43 are provided on the first member 40 on the seat-cushion-front-surface side. The boss 43 protrudes from the first member 40 in an opposing direction of the first member 40 and the second member 41 and the circulation space is maintained by the boss 43 abutting on the second member 41.

The rear region 4r of the chamber 4 is provided with a first region 4a disposed on one side in a seat width direction and a second region 4b disposed on the other side in the seat width direction. The first region 4a is located below a left part of the buttocks and the second region 4b is located below a right part of the buttocks of the occupant. The first region 4a and the second region 4b are curved in a concave shape in which a substantially central portion in the front-rear direction of the seat is lowered with respect to both end portions along the buttocks. The first region 4a and the second region 4b are configured to be able to bend and deform independently from each other toward a downward direction which is an acting direction in which the load of the occupant acts on the seat cushion 2.

First, the first member 40 on the seat-cushion-front-surface side is provided with slits 44 to 46 extending in the front-rear direction of the seat with an interval in the seat width direction. The slit 44 and the slit 45 interpose the first region 4a in the seat width direction and the slit 45 and the slit 46 interpose the second region 4b in the seat width direction. The slit 45 is commonly used for the pair of first slits interposing the first region 4a and the pair of second slits interposing the second region 4b. However, the configuration of the slit 45 may be different.

Figure 4:
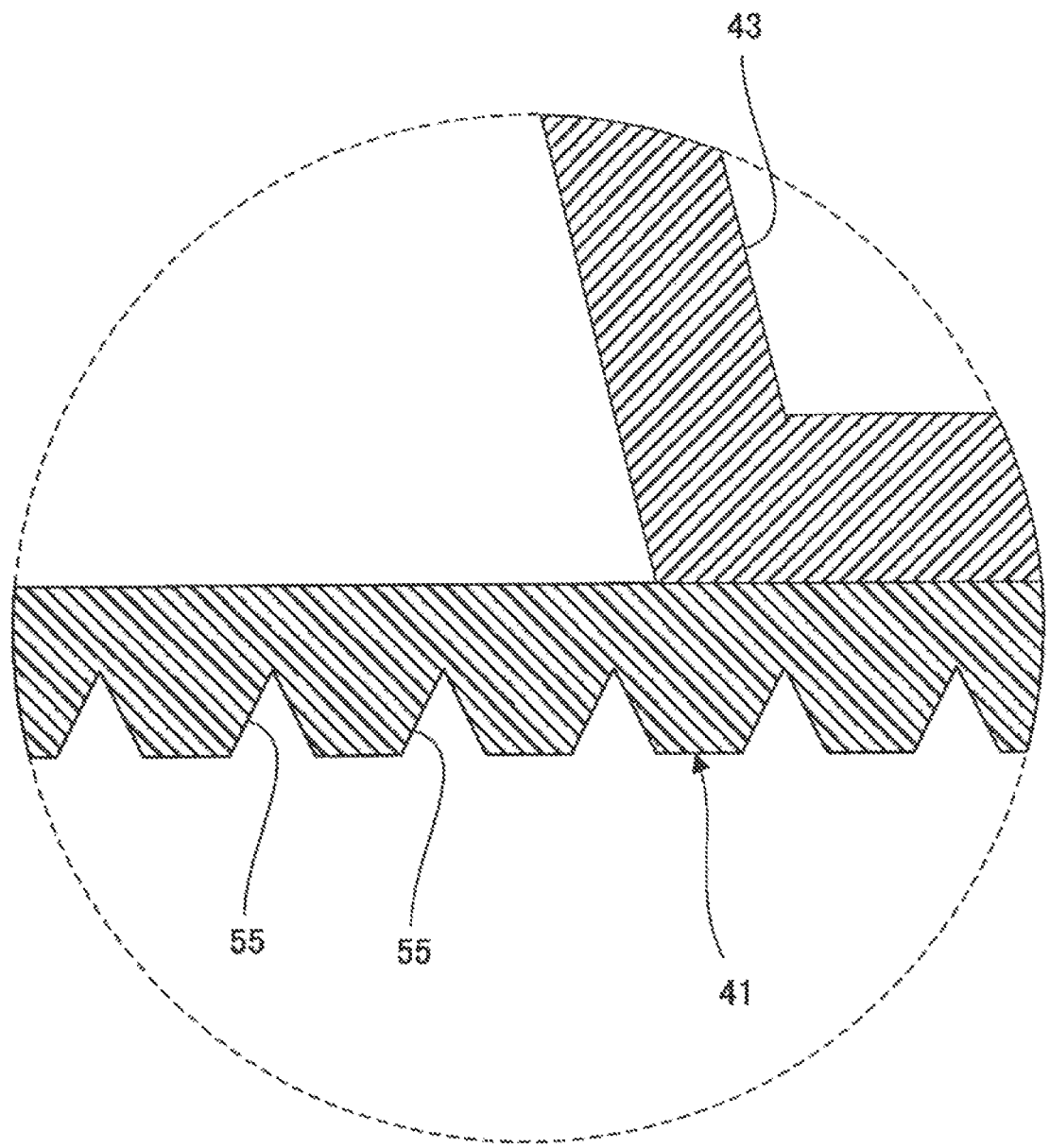
FIG. 4 is an enlarged view of a portion surrounded by a broken line frame IV of the chamber in FIG. 3.

The second member 41 on the seat-cushion-back-surface side is more flexible than the first member 40. As illustrated in FIG. 4, on the outer surface of the second member 41, a large number of concave grooves 55 extending in the front-rear direction of the seat are formed at intervals in the seat width direction, and the flexibility is enhanced by those concave grooves 55. In addition, the second member 41 may be formed more flexible than the first member 40 by making the second member 41 relatively thin or by making the second member 41 of a relatively flexible resin material.

In addition, slits 48 are provided at end portions 47 on both sides in the seat width direction of the first member 40 and end portions 49 on both sides in the seat width direction of the second member 41 are inserted into the slits 48. The end portion 49 of the second member 41 inserted into the slit 48 is engaged with the end portion 47 of the first member 40 so as to be displaceable in the seat width direction with respect to the end portion 47 of the first member 40.

Figure 5:
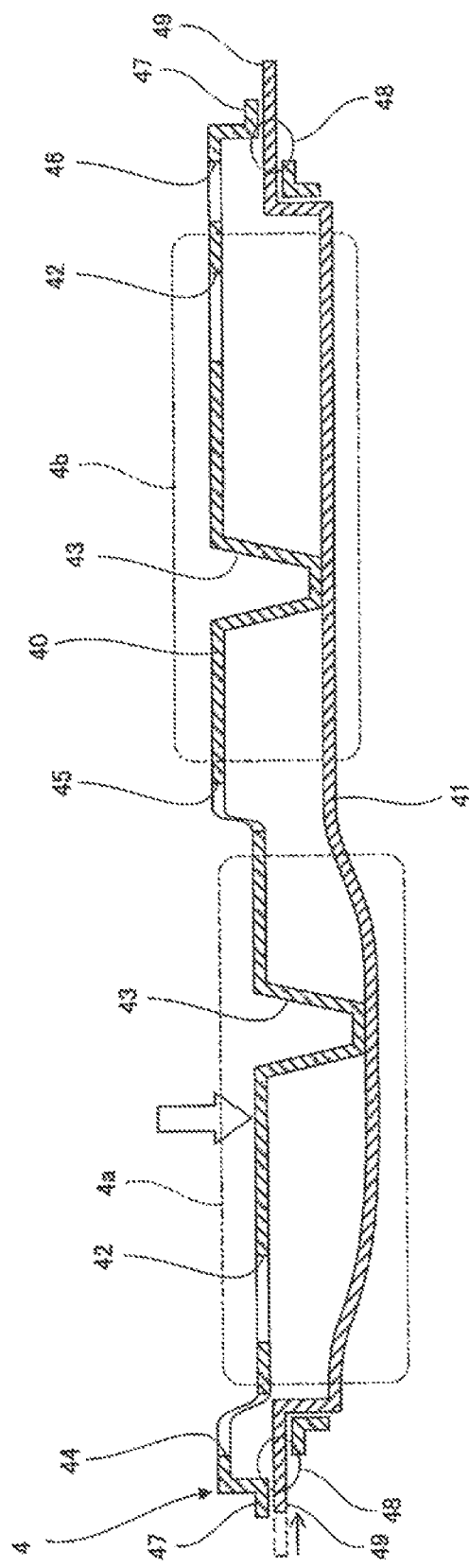
FIG. 5 is a cross-sectional view illustrating an operation of the chamber of FIG. 2.

FIG. 5 illustrates an operation of the chamber 4.

In an example illustrated in FIG. 5, the occupant puts weight on the left buttock and the load of the occupant is mainly input to the first region 4a in the rear region 4r of the chamber 4. The load input to the first region 4a is transmitted to the second member 41 through the bosses 43 of the first member 40. Based on the load transmitted to the second member 41, among the end portions 49 of the second member 41 on both sides in the seat width direction, the end portion 49 on the first region 4a side is drawn toward the center in the seat width direction. By drawing the end portion 49 of the second member 41 on the first region 4a side, the second member 41 sinks downward in the first region 4a and the first member 40 also sinks downward in the first region 4a. The second region 4b separated from the first region 4a by the slit 45 of the first member 40 is not dragged by the sinking of the first region 4a and the first region 4a bends independently of the second region 4b.

Thus, since the first region 4a and the second region 4b can bend and deform independently of each other, lifting of the second region 4b in conjunction with the sinking of the first region 4a is suppressed, and thus the right buttock of the occupant is also suppressed from being pushed up by the second region 4b. Thus, the sitting comfort of the seat 1 is increased.

Figure 6:
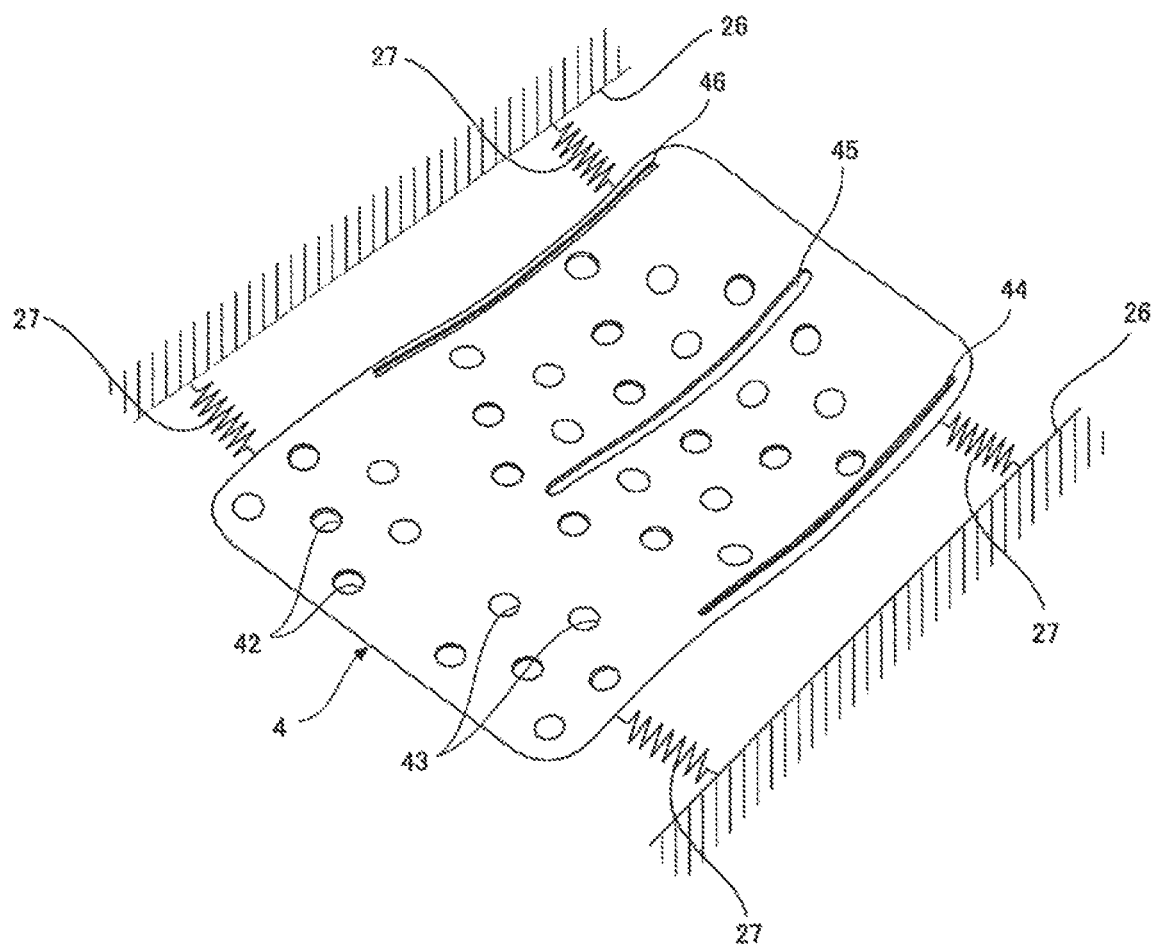
FIG. 6 is a schematic view of a modification example of a seat in FIG. 1.

In the example described above, it is described such that the plurality of springs 25 are arranged below chamber 4 and the chamber 4 is supported by the springs 25 so as to be able to sink downward. However, the support mode of the chamber 4 is not particularly limited. For example, as illustrated in FIG. 6, the plurality of springs 27 may be stretched between a pair of side frames 26 and the chamber 4 and the chamber 4 may be hung by the springs 27. Also, in this case, the chamber 4 can be supported to sink downward.

Figure 7:
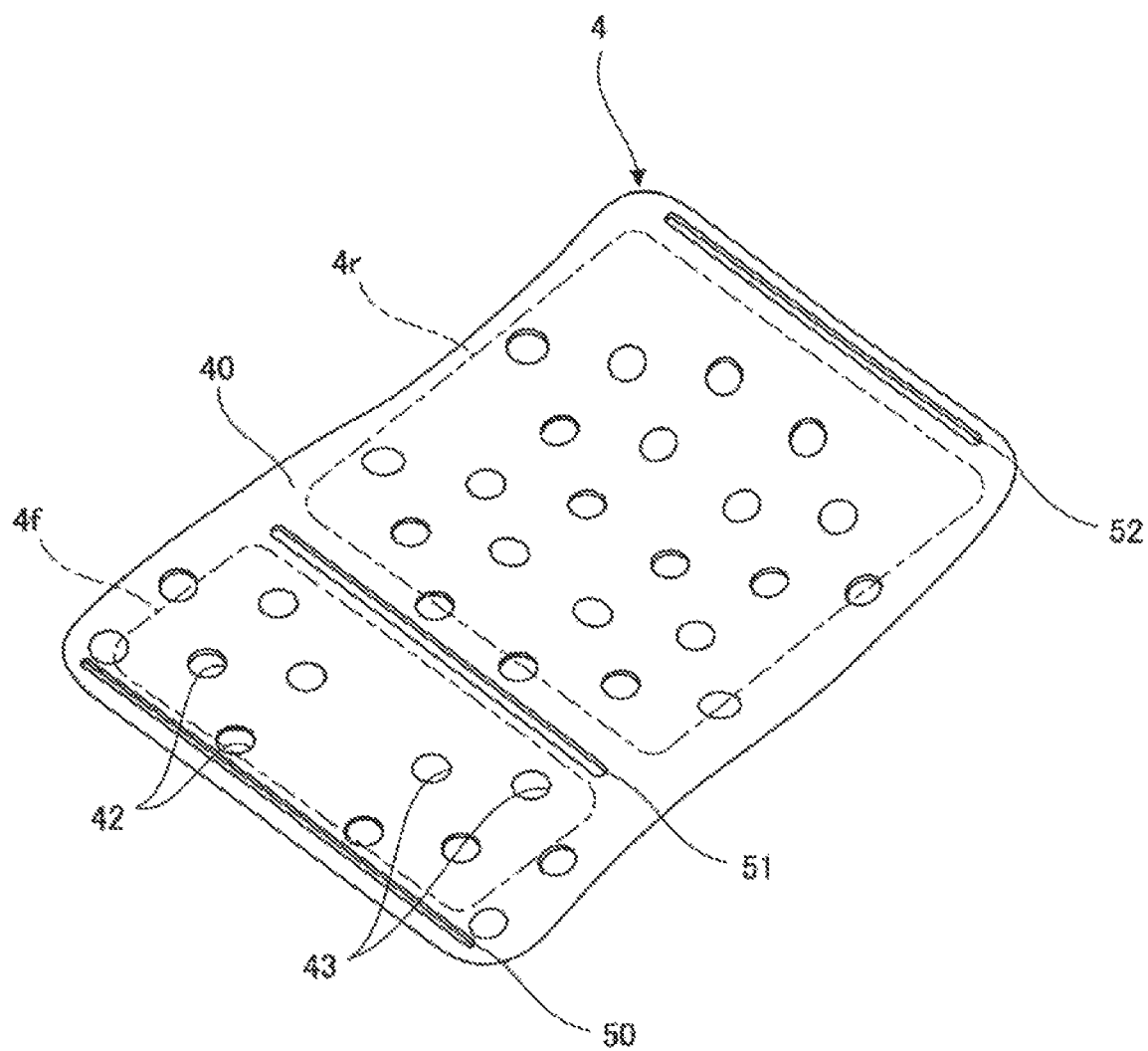
FIG. 7 is a perspective view of another example of the chamber of FIG. 1.
Figure 8:
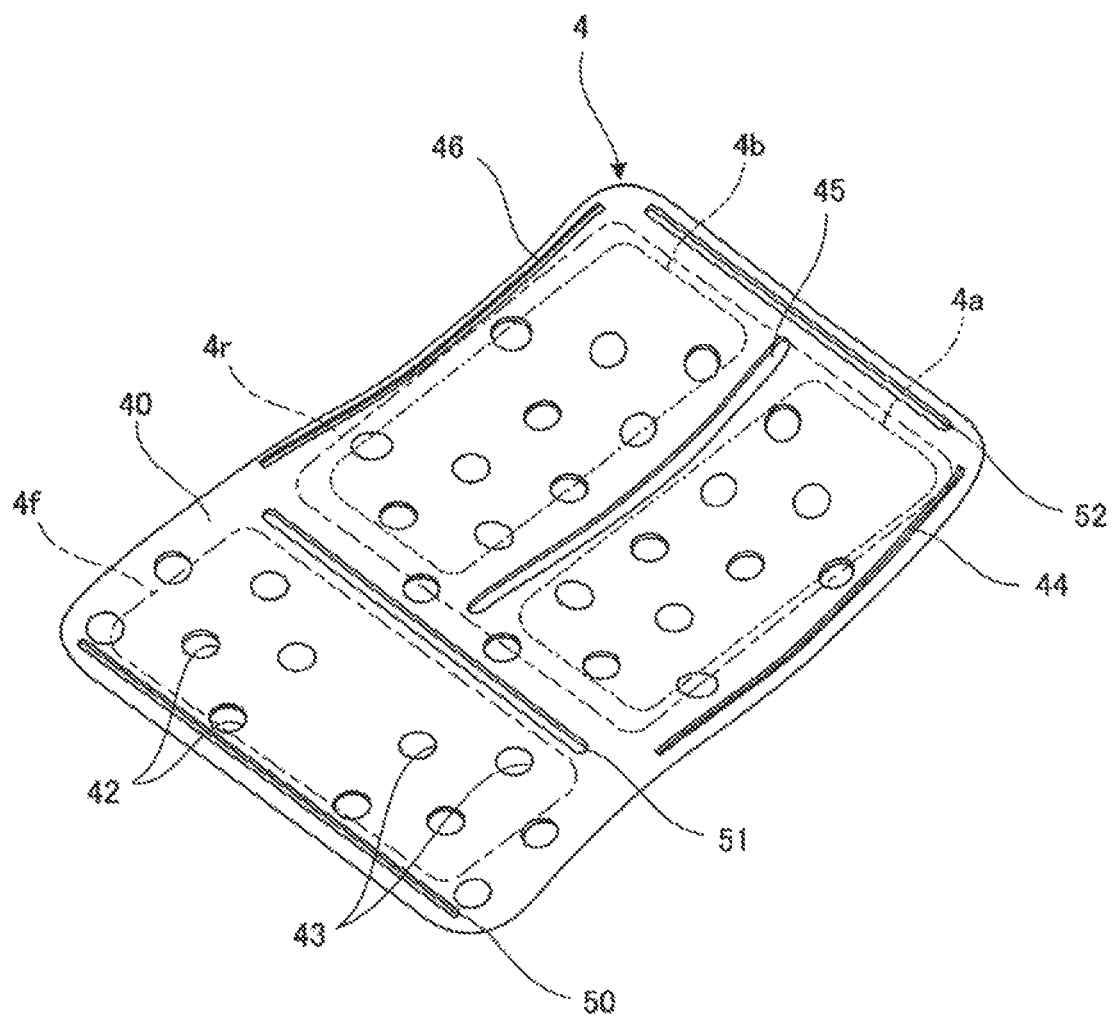
FIG. 8 is a perspective view of still another example of the chamber of FIG. 1.
Figure 9:
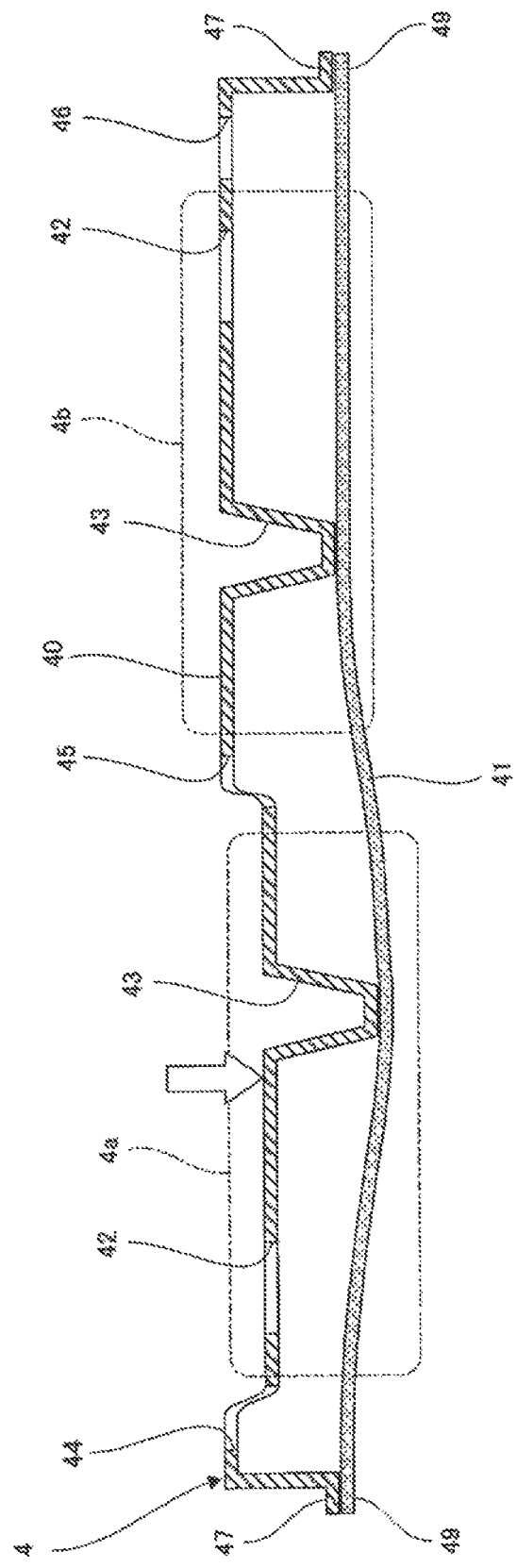
FIG. 9 is a cross-sectional view of another example of the chamber of FIG. 1.

FIGS. 7 to 9 illustrate other examples of the chamber 4.

In the example illustrated in FIG. 7, the front region 4f and the rear region 4r of the chamber 4 are configured to be able to bend and deform independently of each other toward a downward direction which is an acting direction in which the load of the occupant acts on the seat cushion 2.

The first member 40 on the seat-cushion-front-surface side is provided with slits 50 to 52 extending in the seat width direction with an interval in the front-rear direction of the seat. The slit 50 and the slit 51 interpose the front region 4f in the front-rear direction of the seat and the slit 51 and the slit 52 interpose the rear region 4r in the seat width direction.

The second member 41 on the seat-cushion-back-surface side is more flexible than the first member 40. In addition, the end portions of the second member 41 on both sides in the front-rear direction of the seat engage with the end portions of the first member 40 on both sides in the front-rear direction of the seat to be displaced in the front-rear direction of the seat with respect to the end portions of the first member 40 on both sides in the front-rear direction of the seat.

For example, when the occupant puts weight on the buttocks and the load of the occupant is mainly input to the rear region 4r of the chamber 4, the load input to the rear region 4r is transmitted to the second member 41 through the bosses 43 of the first member 40. Therefore, among the end portions of the second member 41 on both sides in the front-rear direction of the seat, the end portion on the rear region 4r side is drawn toward the center in the seat width direction. Thus, the second member 41 sinks downward in the rear region 4r and the first member 40 also sinks downward in the rear region 4r. The front region 4f separated from the rear region 4r by the slit 51 of the first member 40 is not dragged by the sinking of the rear region 4r and the rear region 4r bends independently of the front region 4f.

Since the front region 4f and the rear region 4r can bend and deform independently of each other, lifting of the front region 4f in conjunction with the sinking of the rear region 4r is suppressed, and thus the thighs of the occupant are also prevented from being pushed up by the front region 4f. Thus, the sitting comfort of the seat 1 is increased.

In the example shown in FIG. 8, similar to the example illustrated in FIG. 7, the front region 4f and the rear region 4r of the chamber 4 are configured to be able to bend and deform independently of each other, and further, similar to the example illustrated in FIGS. 2 and 3, the first region 4a and the second region 4b in the rear region 4r are configured to be able to bend and deform independently of each other.

In the example illustrated in FIG. 9, the second member 41 is made of an airtight sheet material having elasticity. Such a sheet material is a sheet material made of a rubber material such as chloroprene rubber, for example. For example, when the occupant puts weight on the left buttock and the load of the occupant is mainly input to the first region 4a of the chamber 4, the load input to the first region 4a is transmitted to the second member 41 through the bosses 43 of the first member 40 and the second member 41 sinks downward in the first region 4a based on its elasticity. The first member 40 also sinks downward in the first region 4a and the first region 4a of the chamber 4 bends independently of the second region 4b. Since the second member 41 bends based on its elasticity, the end portion 49 of the second member 41 in the seat width direction can be fixed to the end portion 47 of the first member 40 in the seat width direction, and thus the structure of the chamber 4 can be simplified.

Figure 10:
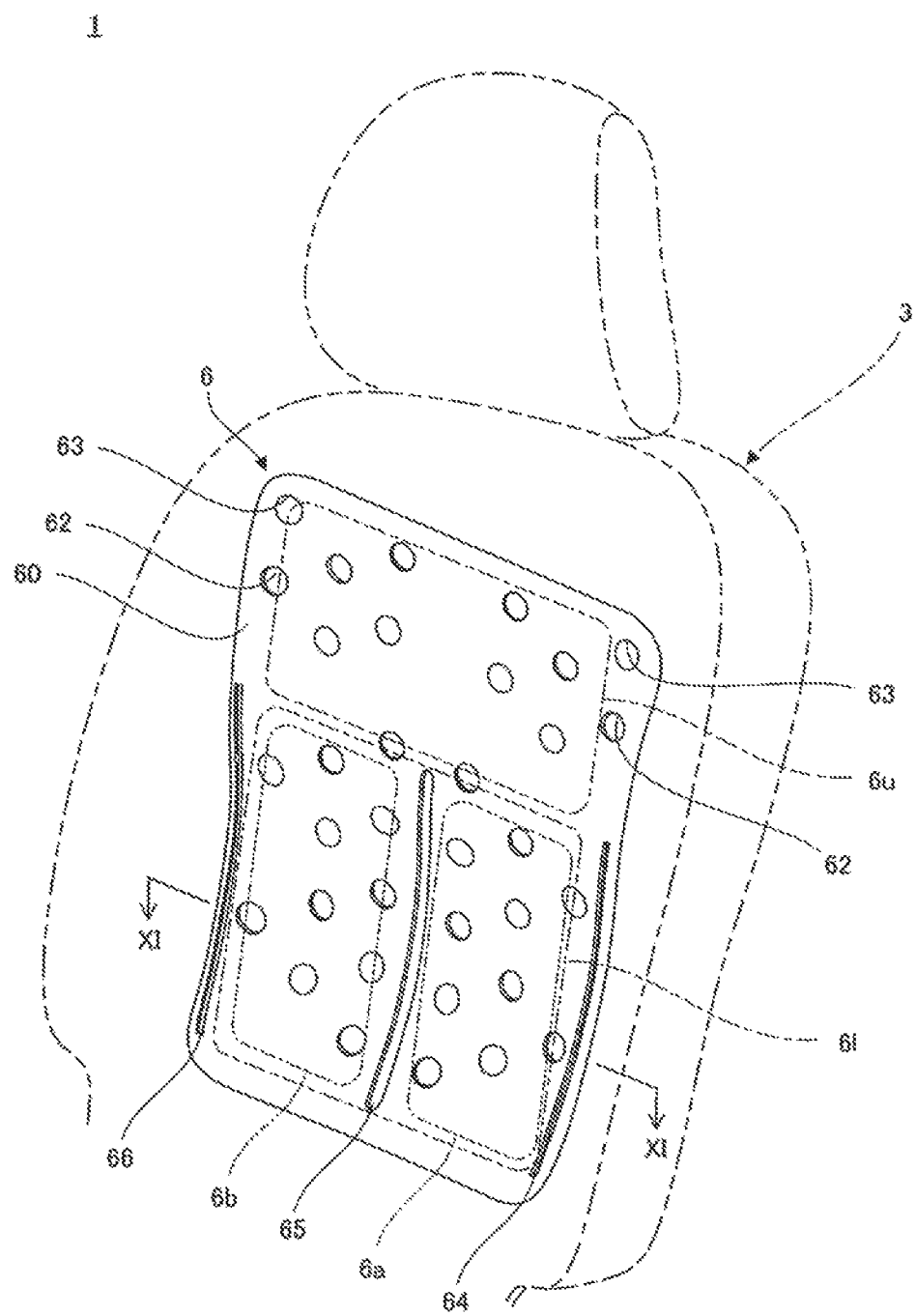
FIG. 10 is a perspective view of a chamber provided on a seat back of a vehicle seat for explaining an embodiment of the invention.
Figure 11:
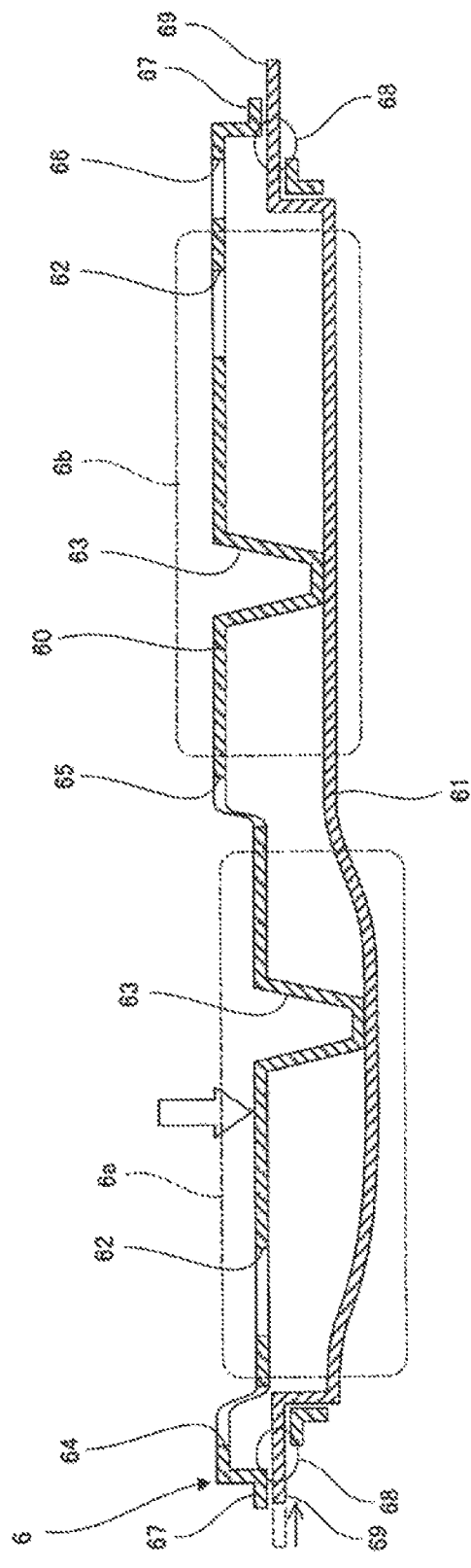
FIG. 11 is a cross-sectional view of the chamber of FIG. 10 taken along the line XI-XI.

A case where the chamber 4 is provided in the seat cushion 2 has been described so far, but the chamber may be provided in a seat back 3 of the seat 1 as illustrated in FIGS. 10 and 11.

At least the seat-back-front-surface side of the chamber 6 provided in the seat back 3 is covered with a pad made of a foam material such as urethane foam. In addition, the rear side opposite to the seat-back-front-surface side of the chamber 6 is supported by a support body such as a spring. When the load of the upper body of an occupant is applied to the seat back 3, the chamber 6 can sink to the rear of the seat, which is the direction of load application.

The chamber 6 includes a first member 60 disposed on the seat-back-front-surface side and a second member 61 disposed on the seat-back-rear-surface side. The first member 60 and the second member 61 are plate members made of a resin material such as polypropylene. The first member 60 and the second member 61 are combined and an air circulation space is formed between the first member 60 and the second member 61. The first member 60 is provided with a plurality of air holes 62 which serve as outlets for air flowing through the circulation space. In addition, a boss 63 is provided on at least one of the first member 60 and the second member 61 so that the circulation space is maintained even when the load of the upper body of the occupant is applied to the seat back 3. In the example illustrated in FIG. 11, a plurality of bosses 63 are provided on the first member 60 on the seat-back-front-surface side.

A lower region 6I of the chamber 6 located behind the occupant's waist is provided with a first region 6a disposed on one side in the seat width direction and a second region 6b disposed on the other side in the seat width direction. The first region 6a is located behind the occupant's left waist and the second region 6b is located behind the occupant's right waist. The first region 6a and the second region 6b are configured to be able to bend and deform independently of each other toward the rear of the seat, which is the acting direction of the load of the upper body of the occupant with respect to the seat back 3.

First, the first member 60 of the chamber 6 on the seat-back-front-surface side is provided with slits 64 to 66 extending in the up-down direction with an interval in the seat width direction. The slit 64 and the slit 65 interpose the first region 6a in the seat width direction and the slit 65 and the slit 66 interpose the second region 6b in the seat width direction.

The second member 61 on the seat-back-rear-surface side is more flexible than the first member 60. In addition, slits 68 are provided at end portions 67 of the first member 60 on both sides in the seat width direction and end portions 69 of the second member 61 on both sides in the seat width direction are inserted into the slits 68. The end portion 69 of the second member 61 inserted into the slit 68 is engaged with the end portion 67 of the first member 60 so as to be displaceable in the seat width direction with respect to the end portion 67 of the first member 60.

For example, when the occupant puts weight on the left waist and the load of the upper body of the occupant is mainly input to the first region 6a in the lower region 6I of the chamber 6, the load input to the first region 6a is transmitted to the second member 61 through the bosses 63 of the first member 60. Based on the load transmitted to the second member 61, among the end portions 69 of the second member 61 on both sides in the seat width direction, the end portions 69 on the first region 6a side is drawn toward the center in the seat width direction. As a result, the second member 61 sinks toward the rear of the seat in the first region 6a and the first member 60 also sinks toward the rear of the seat in the first region 6a. The second region 6b separated from the first region 6a by the slit 65 of the first member 60 is not dragged by the sinking of the first region 6a and the first region 6a bends independently of the second region 6b.

In this way, since the first region 6a and the second region 6b can be bent and deformed independently of each other, lifting of the second region 6b in conjunction with the sinking of the first region 6a is suppressed, and thus the right waist of the occupant is also suppressed from being pushed out by the second region 6b. Thus, the sitting comfort of the seat 1 is increased.

The lower region 6I (first region 6a and second region 6b) of the chamber 6 and an upper region 6u of the chamber 6 as a third region arranged adjacent to the lower region 6I may be configured to be able to bend and deform in the acting direction of the load independently of each other. In this case, the first member 60 is provided with a pair of slits which interpose the lower region 6I in the up-down direction of the seat and a pair of slits which interpose the upper region 6u in the up-down direction of the seat.

The second member 61 may be an airtight sheet material having elasticity. In this case, since the second member 61 bends based on its elasticity, the end portion of the second member 61 can be fixed to the end portion of the first member 60, and thus the structure of the chamber 6 can be simplified.

The invention has been described above by taking the seat installed in a vehicle such as an automobile as an example. However, the invention is also applicable to a vehicle seat other than the automobile such as a ship or an aircraft.

As described above, a vehicle seat disclosed in the specification includes a chamber in which at least a seat-front-surface side is covered with a pad and which circulates the air blown from a front surface of a seat through the pad, a fan which sends air into the chamber, and a support body which supports the chamber so as to be able to sink in an acting direction of a load applied to the surface of the seat, where the chamber includes a first region located on one side in a seat width direction and a second region located on the other side in the seat width direction and the first region and the second region can bend and deform independently of each other in the acting direction of the load.

In the vehicle seat disclosed in the specification, the chamber includes a first member of a plate shape disposed on the seat-front-surface side and a second member which is disposed on a seat-rear-surface side and forms an air circulation space with the first member, and the first member includes a pair of first slits provided to interpose the first region in the seat width direction and a pair of second slits provided to interpose the second region in the seat width direction.

In the vehicle seat disclosed in the specification, the second member is a plate-shaped member which is more flexible than the first member, and end portions of the second member on both sides in the seat width direction engage with end portions of the first member on both sides in the seat width direction so as to be displaceable in the seat width direction with respect to the end portions of the first member on both sides in the seat width direction.

In the vehicle seat disclosed in the specification, the second member is a sheet material having elasticity, and the end portions of the second member on both sides in the seat width direction are fixed to the end portions of the first member on both sides in the seat width direction.

In the vehicle seat disclosed in the specification, the chamber further includes a third region disposed adjacent to the first region and the second region, and the first region, the second region, and the third region can bend and deform independently of each other in the acting direction of the load.

A vehicle seat disclosed in the specification includes a chamber in which at least a seat-cushion-front-surface side is covered with a pad and which circulates the air blown from a front surface of a seat cushion through the pad, a fan which sends air into the chamber, and a support body which supports the chamber so as to be able to sink in an acting direction of a load applied to the front surface of the seat cushion, where the chamber includes a front region located on a front portion of the seat cushion and a rear region located on a rear portion of the seat cushion, and the front region and the rear region can bend and deform independently of each other in the acting direction of the load.

A vehicle seat disclosed in the specification includes a chamber in which at least a seat-back-front-surface side is covered with a pad and which circulates the air blown from a front surface of a seat back through the pad, a fan which sends air into the chamber, and a support body which supports the chamber so as to be able to sink in an acting direction of a load applied to the front surface of the seat back, where the chamber includes an upper region located on an upper portion of the seat back and a lower region located on a lower portion of the seat back, and the upper region and the lower region can bend and deform independently of each other in the acting direction of the load.

Figure 12:
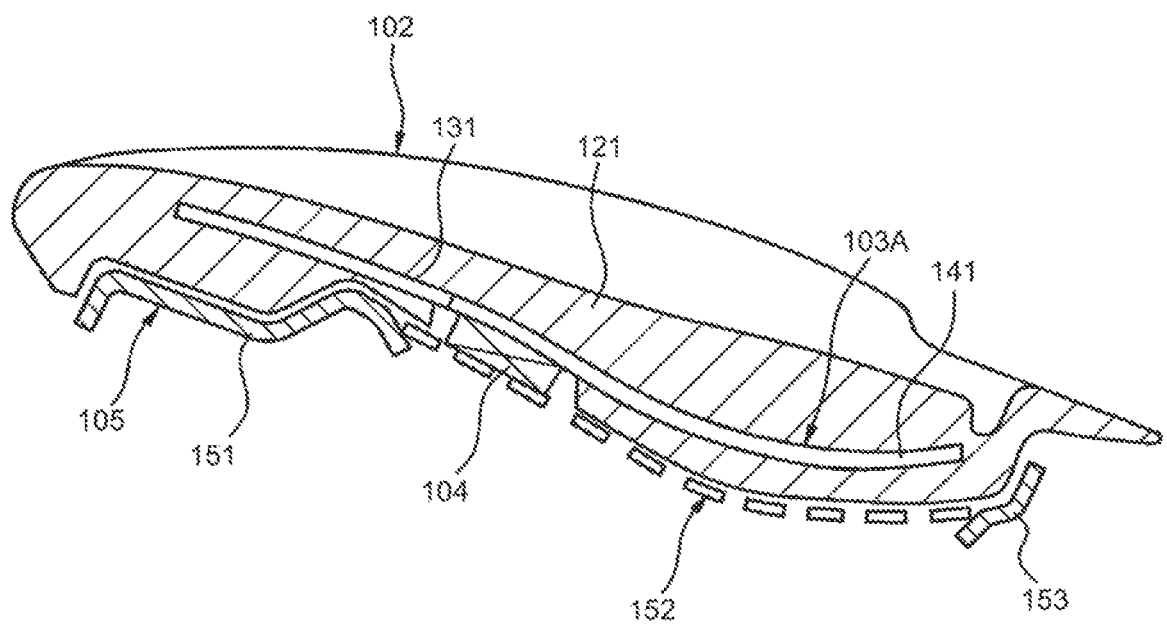
FIG. 12 is a cross-sectional view illustrating an example of a vehicle seat for explaining an embodiment of the invention.

FIG. 12 illustrates an example of a vehicle seat for explaining an embodiment of the invention.

A vehicle seat (hereinafter also simply referred to as a seat) 101A illustrated in FIG. 12 is a seat 101A installed in a vehicle such as an automobile, for example. The vehicle seat 101A includes a seat cushion 102 which supports the buttocks and thighs of an occupant (hereinafter referred to as a seated person) seated on the seat 101A and a seat back (not illustrated) which supports the waist and back of the seated person.

The seat cushion 102 includes a pad 121 made of a foam material such as urethane foam, a chamber 103A in which at least a front-surface side of the seat cushion 102 is covered with a pad, a fan 104 for sending air into the chamber 103A, and a frame 105 which supports the pad 121 and the chamber 103A. The air sent into the chamber 103A by the fan 104 flows through the chamber 103A and is blown out from the surface of the seat cushion 102 through the pad 121. By blowing air from the surface of the seat cushion 102, the temperature and humidity of the surface of the seat cushion 102 in contact with a seated person are adjusted. The pad 121 is covered with a trim cover made of leather, fabric, knitted fabric, or the like, and among those, when the trim cover is made of leather, the trim cover is provided with a large number of air holes and the air permeability of the trim cover is ensured.

The frame 105 includes a front frame 151 and a rear frame 153 which connect a pair of side frames (not illustrated) and a plurality of springs 152 suspended between the front frame 151 and the rear frame 153. The front frame 151 is disposed below the pad 121 and the chamber 103A on a front portion side of the seat cushion 102 and front portions of the pad 121 and the chamber 103A are supported by the front frame 151. The plurality of springs 152 are disposed below the pad 121 and the chamber 103A on a rear portion side of the seat cushion 102 and rear portions of the pad 121 and the chamber 103A are supported by the plurality of springs 152. The spring 152 is formed by bending a metal wire member into a wave shape and a planar shape and can be expanded and contracted in a front-rear direction of the seat cushion 102.

In an example illustrated in FIG. 12, a part of a lower surface facing a spring 152 side at a rear portion of the chamber 103A is exposed and the fan 104 is directly attached to the exposed lower surface of the chamber 103A. However, the attachment location of the fan 104 is not particularly limited. The fan 104 may be connected to the chamber 103A via a tube. In this case, the fan 104 can be attached to a lower portion of the front frame 151 or the rear frame 153, for example.

Figure 13:
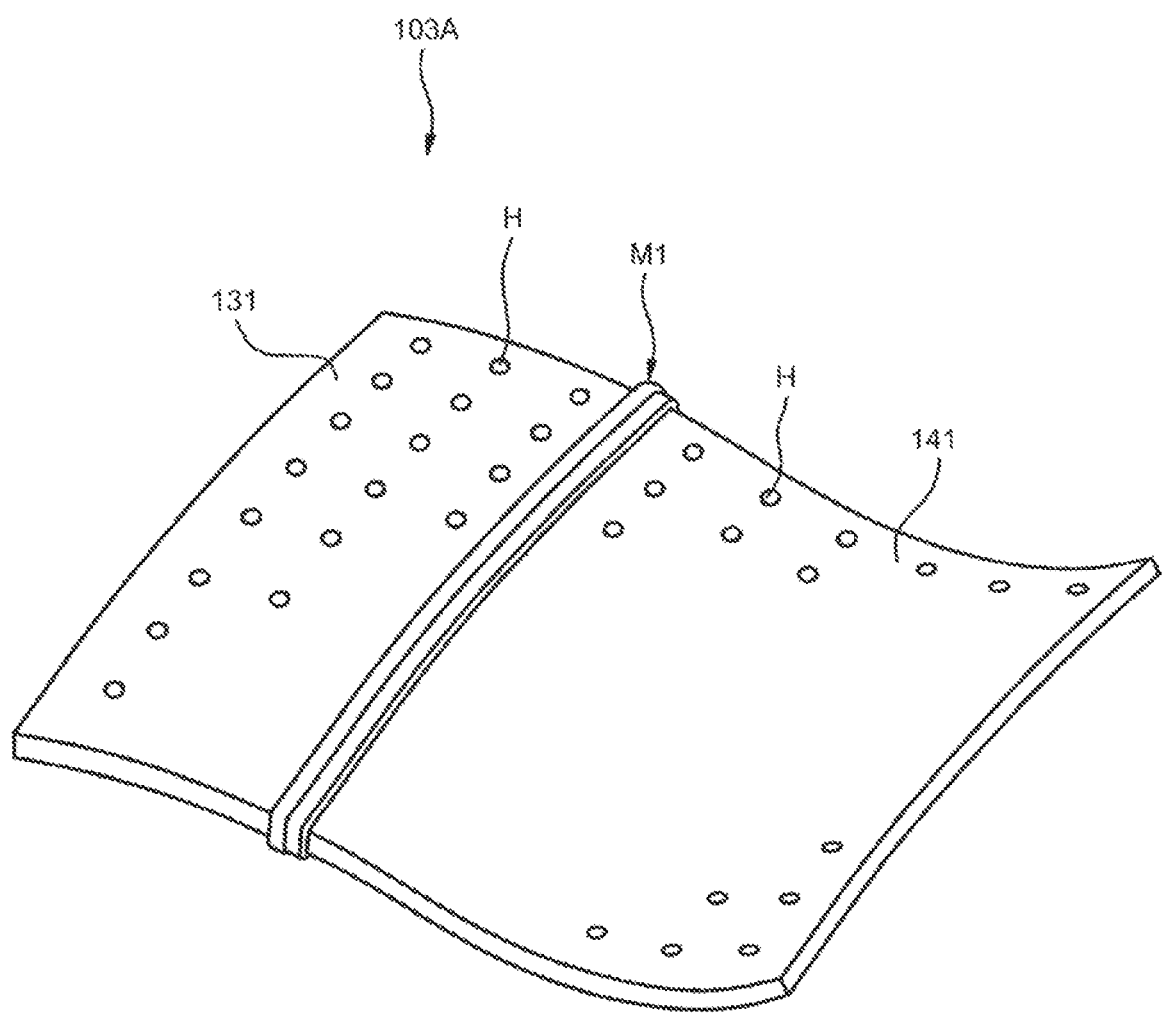
FIG. 13 is a perspective view of a chamber of FIG. 12.
Figure 14A:
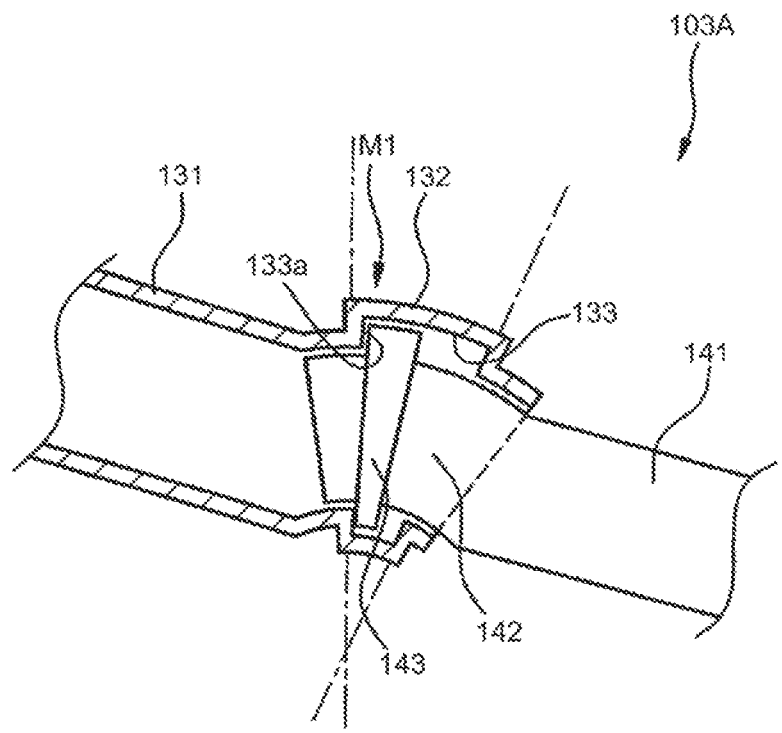
FIGS. 14A and 14B are cross-sectional views of a fitting portion of a front chamber and a rear chamber of FIG. 13.
Figure 14B:
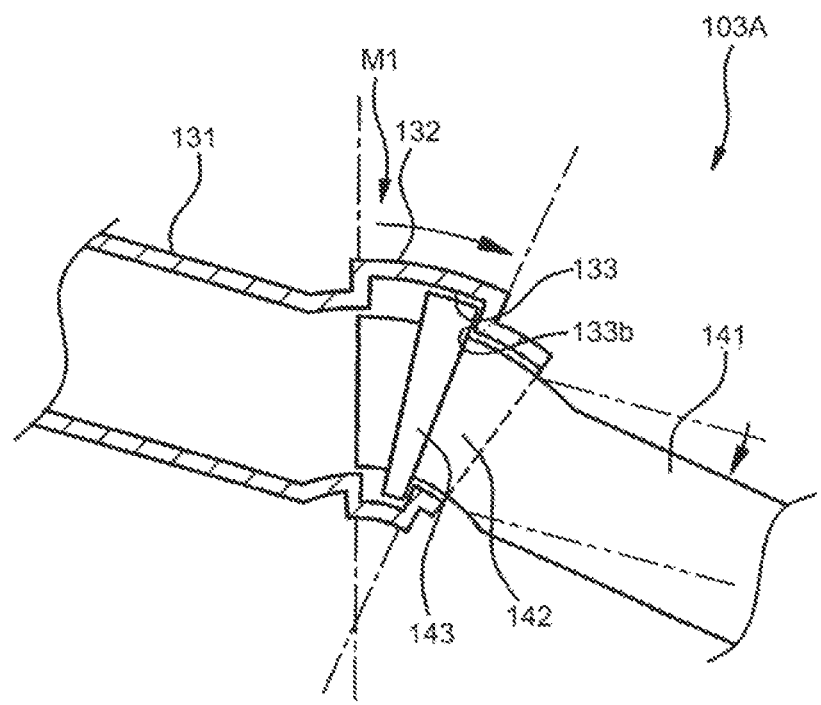

FIGS. 13 to 14B illustrate the chamber 103A.

The chamber 103A includes a front chamber 131 disposed on a front side of the seat cushion 102 and a rear chamber 141 disposed on a rear side of the seat cushion 102. Between the front chamber 131 and the rear chamber 141, a first movable portion M1 which allows the rear chamber 141 to sink with respect to the front chamber 131 is provided. The front chamber 131 and the rear chamber 141 are separate members and are connected via the first movable part M1.

The front chamber 131 and the rear chamber 141 are made of a relatively hard resin material and are formed in a substantially rectangular hollow plate shape. The internal space of the front chamber 131 and the rear chamber 41 circulates the air sent to the chamber 103 by the fan 104 (see FIG. 12). In order to suppress the deformation of the front chamber 131 and the rear chamber 141 with respect to the load, a plurality of protrusions may be provided on one or both of an upper wall and a lower wall of the front chamber 131 so that the distance between the upper wall and the lower wall is maintained. Similarly, a plurality of protrusions may be provided on one or both of an upper wall and a lower wall of the rear chamber 141 so that the distance between the upper wall and the lower wall is maintained.

As illustrated in FIG. 14, the front chamber 131 has a fitting portion 132 and the rear chamber 141 has a fitting portion 142. The fitting portion 132 of the front chamber 131 is an opening provided at the rear end portion of the front chamber 131 and the fitting portion 142 of the rear chamber 141 is an opening provided at the front end portion of the rear chamber 141. In the example illustrated in FIG. 14, the fitting portion 142 of the rear chamber 141 is accommodated in the fitting portion 132 of the front chamber 131, but the fitting portion 132 may be accommodated in the fitting portion 142. By fitting the fitting portions 132 and 142 to each other, the internal space of the front chamber 131 through which air is circulated and the internal space of the rear chamber 141 are communicated. A large number of ventilation holes H are formed in the upper walls of the front chamber 131 and the rear chamber 141 covered by the pad 121. The air sent into the chamber 103A by the fan 104 is blown out from those ventilation holes H, and then blown out from the surface of the seat cushion 102 through the pad 121.

The first movable portion M1 is constituted of the fitting portion 132 of the front chamber 131 and the fitting portion 142 of the rear chamber 141 which are fitted to each other. As illustrated in FIG. 14, in a cross section extending in the front-rear direction of the seat cushion 102, that is, a cross section perpendicular to a width direction, the fitting portion 132 of the front chamber 131 and the fitting portion 142 of the rear chamber 141 are formed in a concentric fan shape. The fitting portion 142 of the rear chamber 141 is pivotable in a circumferential direction around a center O of the fan shape inside the fitting portion 132 of the front chamber 131. By pivoting the fitting portion 142, the rear chamber 141 can be inclined independently of the front chamber 131 and the rear end portion of the rear chamber 141 is lowered according to the inclination of the rear chamber 141.

In an example illustrated in FIG. 14, the fitting portion 132 of the front chamber 131 arranged on the outside has an annular recess portion 133 and the fitting portion 142 of the rear chamber 141 disposed on the inner side has an annular convex portion 143 which engages with the annular recess portion 133. In a cross section extending in the front-rear direction of the seat cushion 102, the annular recess portion 133 and the annular convex portion 143 are formed in a concentric fan shape and the centers of the annular recess portion 133 and the annular convex portion 143 are the same as the center O of the fitting portion 132 of the front chamber 131 and the fitting portion 142 of the rear chamber 141 which are also formed in a fan shape.

The annular convex portion 143 moves the annular recess portion 133 integrally with the fitting portion 142 according to pivoting of the fitting portion 142 of the rear chamber 141. The annular convex portion 143 abuts on a front end surface 133a of the annular recess portion 133 located on one side in a moving direction or a rear end surface 133b of the annular recess portion 133 located on the other side. The abutment between the annular convex portion 143 and the rear end surface 133b of the annular recess portion 133 prevents the fitting portion 142 of the rear chamber 141 from falling off the fitting portion 132 of the front chamber 131. Further, due to the abutment between the annular convex portion 143 and the front end surface 133a or the rear end surface 133b of the annular recess portion 133, the airtightness of the first movable portion M1 is enhanced, and thus the air flowing through the inner side of the front chamber 131 and the rear chamber 141 is prevented from leaking from the first movable portion M1.

Figure 15:
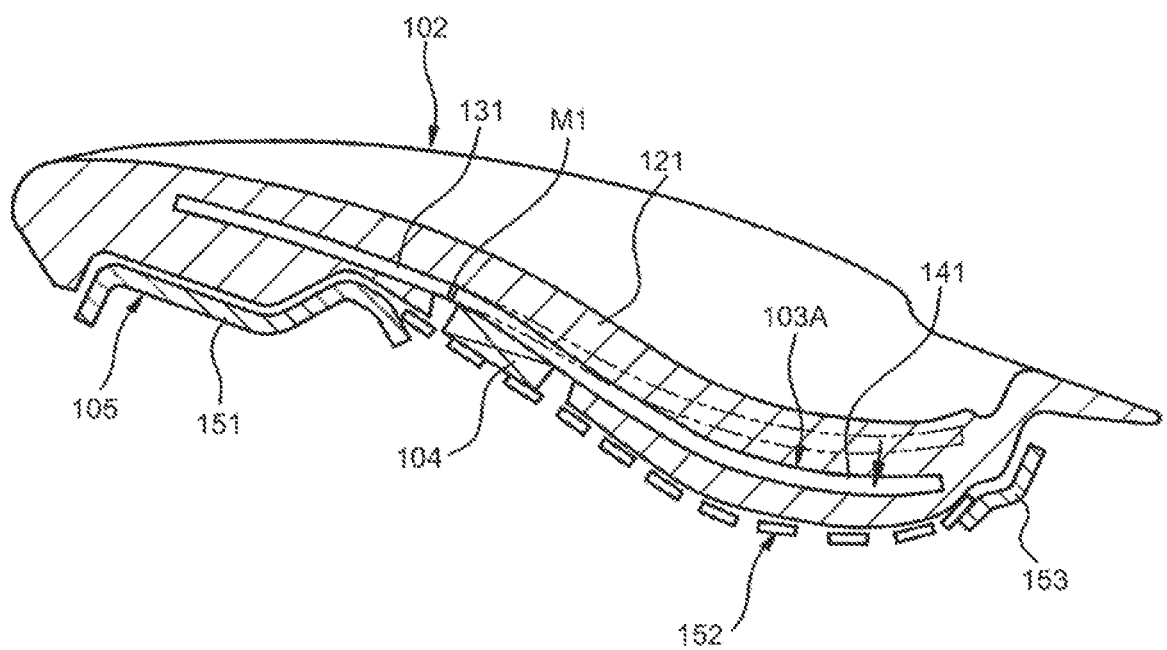
FIG. 15 is a cross-sectional view illustrating an operation of the chamber of FIG. 12.

FIG. 15 illustrates the operation of the chamber 103A.

The load applied to the rear side of the seat cushion 102 which supports the buttocks of a seated person is greater than the load applied to the front side of the seat cushion 102 which supports the thighs of the seated person. In addition, on the front side of the seat cushion 102, the pad 121 and the chamber 103A are rigidly supported by the front frame 151, whereas on the rear side of the seat cushion 102 where a relatively large load is applied, the pad 121 and the chamber 103A are elastically supported by the plurality of springs 152. Therefore, the rear side of the seat cushion 102 sinks below the front side of the seat cushion 102. In this case, the rear end portion of the rear chamber 141 disposed on the rear side of the seat cushion 102 is pushed down and the rear chamber 141 is inclined. However, the inclination of the rear chamber 141 is absorbed by the first movable portion M1 located between the front chamber 131 and the rear chamber 141, and the front end portion of the front chamber 131 is prevented from being lifted. Thus, the thighs of a seated person are prevented from being pressed by the front end portion of the front chamber 131, and thus the sitting comfort is enhanced.

Figure 16A:
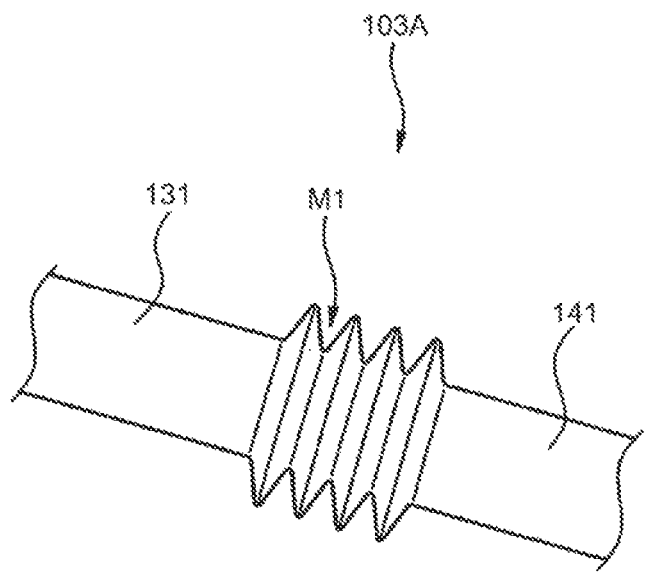
FIGS. 16A and 16B are side views of a modification example of the chamber of FIG. 12.
Figure 16B:
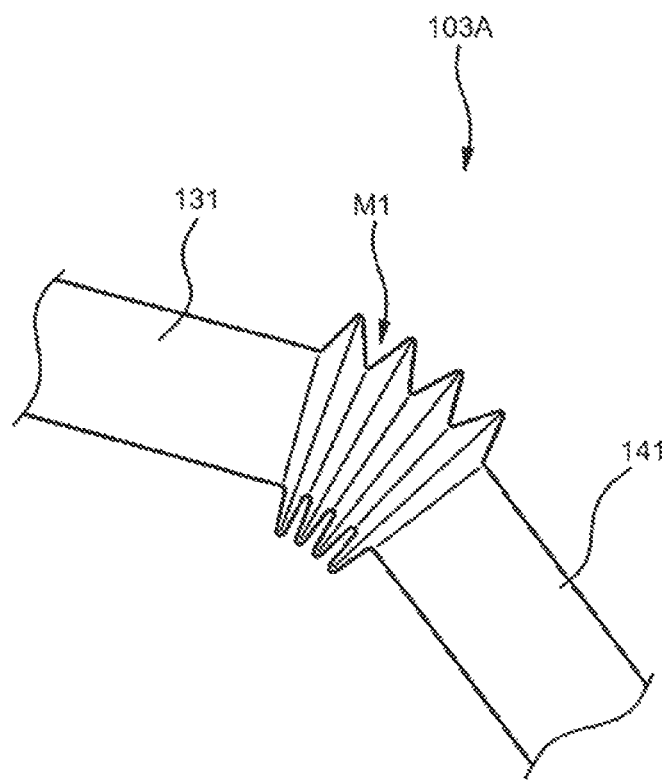

FIGS. 16A and 16B illustrate a modification example of the chamber 103A.

In an example illustrated in FIGS. 13 to 14B, the front chamber 131 and the rear chamber 141 are separate members, but as illustrated in FIGS. 16A and 16B, the front chamber 131 and the rear chamber 141 may be integrally formed. When the front chamber 131 and the rear chamber 141 are integrally formed, the first movable portion M1 between the front chamber 131 and the rear chamber 141 is formed in a bellows shape. As the first movable portion M1 expands and contracts in the front-rear direction and curves, the rear chamber 141 can sink with respect to the front chamber 131. The first movable portion M1 which can expand and contract in the front-rear direction and be bent may be formed integrally with the front chamber 131 and the rear chamber 141 made of a relatively soft resin material, for example, by two-color molding using a relatively soft resin material.

By forming the front chamber 131 and the rear chamber 141 integrally, the airtightness of the first movable portion M1 is further enhanced. Further, since the front chamber 131 and the rear chamber 141 are integrally formed, the number of parts and the manufacturing cost of the chamber 103A are reduced.

Figure 17:
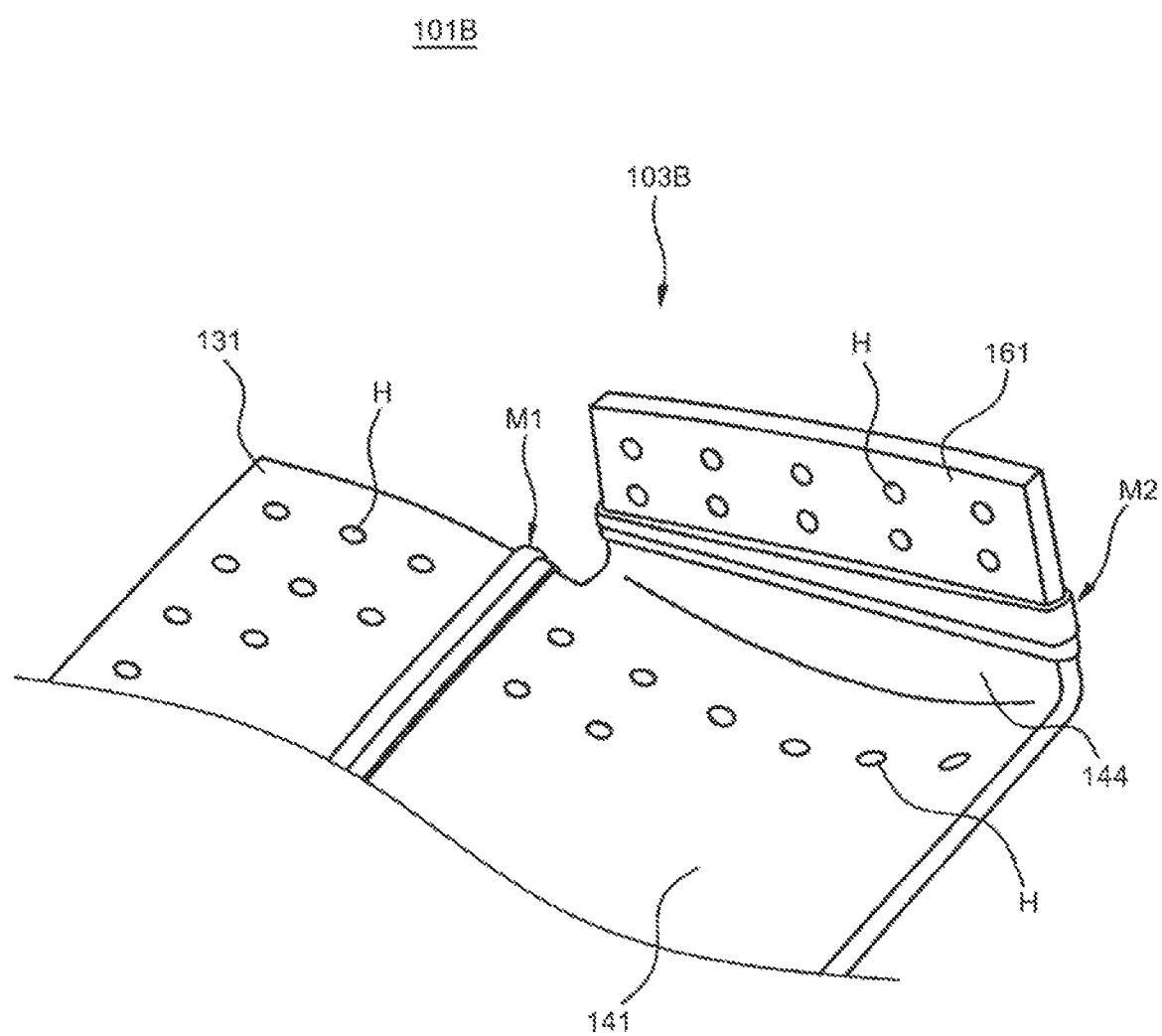
FIG. 17 is a perspective view of a chamber of another example of a vehicle seat for explaining an embodiment of the invention.
Figure 18A:
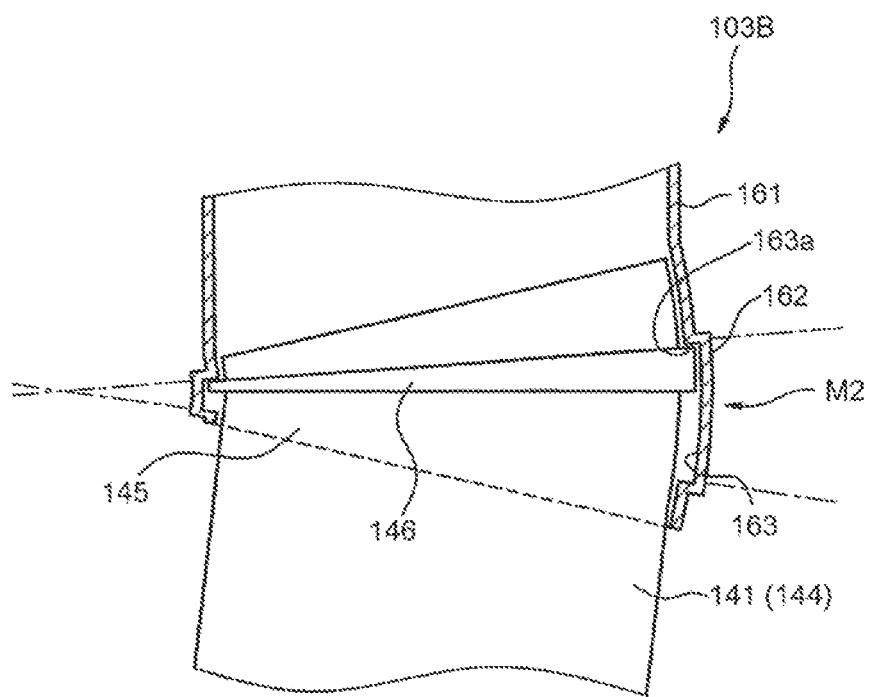
FIGS. 18A and 18B are cross-sectional views of a fitting portion of a rear chamber and a side chamber of FIG. 17.
Figure 18B:
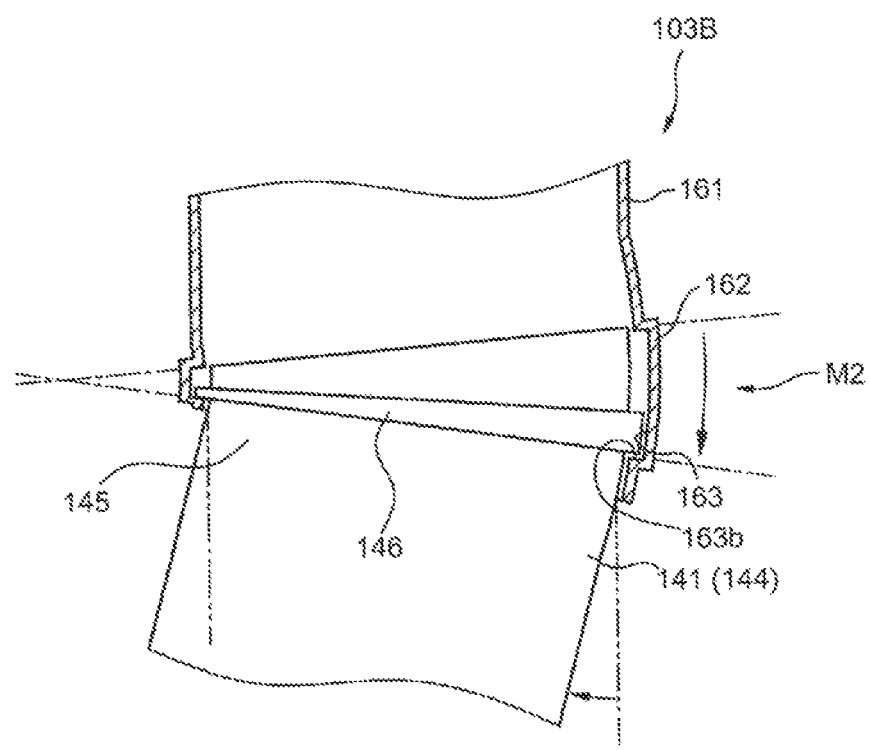

FIGS. 17 to 18B illustrate another example of a vehicle seat for explaining the embodiment of the invention.

The seat cushion of a vehicle seat 101B illustrated in FIG. 17 includes a chamber 103B in which at least the surface side of the seat cushion is covered with a pad, similar to the vehicle seat 101A illustrated in FIG. 12. The air sent into the chamber 103B by a fan circulates through the chamber 103B and is blown out from the surface of the seat cushion through the pad. The rear parts of the chamber 103B and the pad are elastically supported by a plurality of springs suspended between the front frame and the rear frame of the seat cushion frame, and other portions except for the rear portions of the chamber 103B and the pad are rigidly supported by the seat cushion frame.

The chamber 103B includes a front chamber 131 and a rear chamber 141, and further has a pair of side chambers 161. Similar to the front chamber 131 and the rear chamber 141, the side chamber 161 is made of a relatively hard resin material and is formed in a substantially rectangular hollow plate shape. The internal space of the side chamber 161 circulates the air sent to the chamber 103B by the fan. The rear chamber 141 has a pair of extending portions 144 which extend upward from both sides of the rear chamber 141. The side chamber 161 is provided above the extending portion 144 of the rear chamber 141 and a second movable portion M2 which allows the rear chamber 141 to sink relative to the side chamber 161 is provided between the rear chamber 141 and the side chamber 161. The rear chamber 141 and the side chambers 161 are separate members and are connected via the second movable portions M2.

As illustrated in FIGS. 18A and 18B, the side chamber 161 includes a fitting portion 162 and the rear chamber 141 includes a fitting portion 145. The fitting portion 162 of the side chamber 161 is an opening provided at the lower end portion of the side chamber 161 and the fitting portion 45 of the rear chamber 141 is an opening provided at the upper end portion of the extending portion 144 of the rear chamber 141. In the example illustrated in FIGS. 18A and 18B, the fitting portion 145 of the rear chamber 141 is accommodated in the fitting portion 162 of the side chamber 161, but the fitting portion 162 may be accommodated in the fitting portion 145. By fitting the fitting portions 145 and 162 to each other, the inner space of the rear chamber 141 through which air is circulated and the inner space of the side chamber 161 communicate with each other. A large number of ventilation holes H are formed in a side wall of the side chamber 161 covered with the pad. The air blown into the chamber 103B by the fan is blown out from those ventilation holes H, and then blown out from the surface of the seat cushion through the pad.

The second movable portion M2 is constituted of the fitting portion 145 of the rear chamber 141 and the fitting portion 162 of the side chamber 161 which are fitted to each other. As illustrated in FIGS. 18A and 18B, in the cross section extending in the front-rear direction of the seat cushion 102, that is, the cross section perpendicular to the width direction, the fitting portion 145 of the rear chamber 141 and the fitting portion 162 of the side chamber 161 are formed in a concentric fan shape. Inside the fitting portion 162 of the side chamber 161, the fitting portion 142 of the rear chamber 141 is pivotable in the circumferential direction around the center O of the fan shape. By pivoting of the fitting portion 145, the rear chamber 141 can be inclined independently of the side chamber 161 and the rear end portion of the rear chamber 141 is lowered according to the inclination of the rear chamber 141.

Due to the load of a seated person, the rear side of the seat cushion sinks downward and the rear end portion of the rear chamber 141 disposed on the rear side of the seat cushion is pushed down, and thus the rear chamber 141 is inclined. However, the inclination of the rear chamber 141 is absorbed by the second movable portion M2 located between the rear chamber 141 and the side chamber 161, and thus the side chamber 161 is prevented from being dragged by the rear chamber 141 and sinking downward.

In the example illustrated in FIGS. 18A and 18B, the fitting portion 162 of the side chamber 161 arranged on the outside includes an annular recess portion 163 and the fitting portion 145 of the rear chamber 141 disposed inside includes an annular convex portion 146 which engages with the annular recess portion 163. In the cross section extending in the front-rear direction of the seat cushion, the annular convex portion 146 and the annular recess portion 163 are formed in a concentric fan shape and the centers of the annular convex portion 146 and the annular recess portion 163 are the same as the center O of the fitting portion 145 of the rear chamber 141 and the fitting portion 162 of the side chamber 161 which are also formed in a fan shape.

The annular convex portion 146 moves the annular recess portion 163 integrally with the fitting portion 145 according to the pivoting of the fitting portion 145 of the rear chamber 141. The annular convex portion 146 abuts on an upper end surface 163a of the annular recess portion 163 located on one side in a moving direction or a lower end surface 163b of the annular recess portion 163 located on the other side. The abutment between the annular convex portion 146 and the lower end surface 163b of the annular recess portion 163 prevents the fitting portion 145 of the rear chamber 141 from falling off the fitting portion 162 of the side chamber 161. Further, due to the abutment between the annular convex portion 146 and the upper end surface 163a or the lower end surface 163b of the annular recess portion 163, the airtightness of the second movable portion M2 is increased, and thus the air flowing through the rear chamber 141 and the side chamber 161 is prevented from leaking from the second movable portion M2.

Figure 19A:
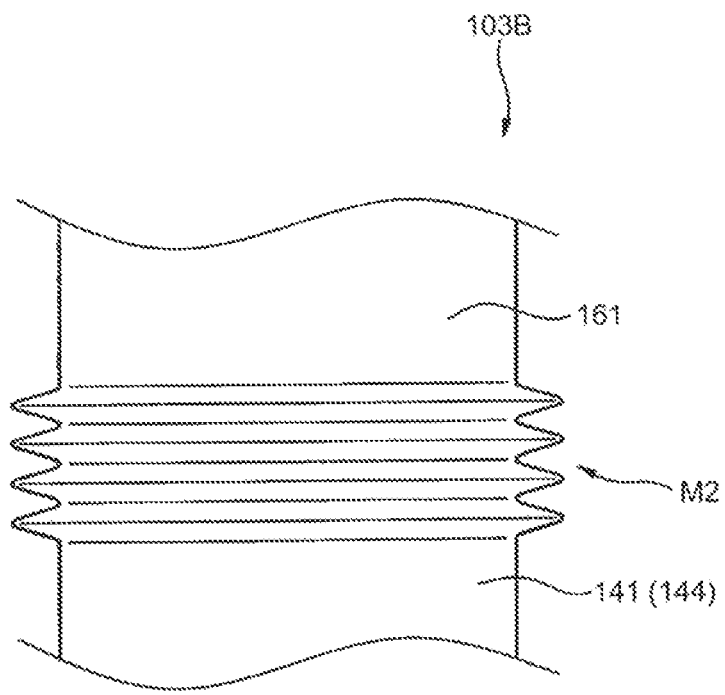
FIGS. 19A and 19B are side views of a modification example of the chamber of FIG. 17.
Figure 19B:
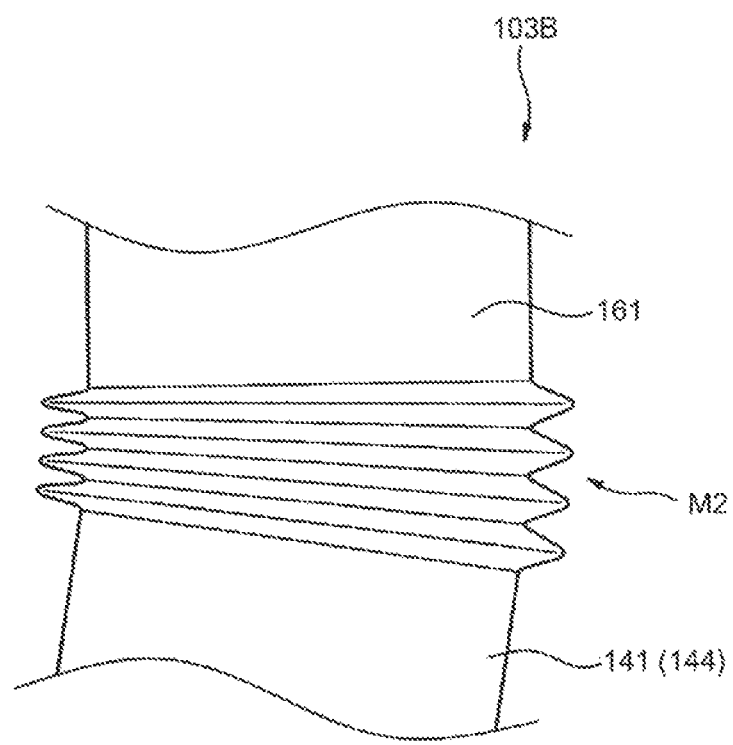

FIGS. 19A and 19B illustrate a modification example of the chamber 103B.

In the example illustrated in FIGS. 17 to 18B, the rear chamber 141 and the side chamber 161 are separate members. However, as illustrated in FIGS. 19A and 19B, the rear chamber 141 and the side chamber 161 may be integrally formed. When the rear chamber 141 and the side chamber 161 are integrally formed, the second movable portion M2 between the rear chamber 141 and the side chamber 161 is formed in a bellows shape. As the second movable portion M2 expands and contracts in the up-down direction and curves, the rear chamber 141 can sink with respect to the side chamber 161. The second movable portion M2 which can be expanded and contracted in the up-down direction and bent can be formed integrally with the rear chamber 141 and the side chamber 161 made of a relatively soft resin material, for example, by two-color molding using a relatively soft resin material.

By forming the rear chamber 141 and the side chamber 161 integrally, the airtightness of the second movable portion M2 is further enhanced. Further, since the rear chamber 141 and the side chamber 161 are integrally formed, the number of parts and the manufacturing cost of the chamber 103B are reduced.

The invention has been described above by taking the seats 101A and 101B installed in a vehicle such as an automobile as an example. However, the invention can also be applied to a seat for a vehicle other than the automobile such as a ship or an aircraft.

As described above, a vehicle seat disclosed in the specification includes a chamber in which at least a front-surface side of a seat cushion is covered with a pad and which circulates the air blown from a surface of the seat cushion through the pad, a fan which sends air into the chamber; and a frame which supports the pad and the chamber, where the frame includes a front frame disposed below the pad and the chamber on a front side of the seat cushion and a plurality of springs disposed below the pad and the chamber on a rear side of the seat cushion, and the chamber includes a front chamber disposed on the front side of the seat cushion, a rear chamber disposed on the rear side of the seat cushion, and a first movable portion which is provided between the front chamber and the rear chamber and allows the rear chamber to sink with regard to the front chamber.

In the vehicle seat disclosed in the specification, the front chamber and the rear chamber are formed separately and respectively includes fitting portions which fit to each other, and the first movable portion is constituted by the fitting portion of the front chamber and the fitting portion of the rear chamber, and further in a cross section perpendicular to a width direction of the seat cushion, the fitting portion of the front chamber and the fitting portion of the rear chamber are formed in a fan shape, and still further the fitting portion of the rear chamber is pivotable about a center of the fan shape with respect to the fitting portion of the front chamber.

In the vehicle seat disclosed in the specification, between the fitting portion of the front chamber and the fitting portion of the rear chamber, one fitting portion arranged on the outside includes an annular recess portion and the other fitting portion includes an annular convex portion which engages with the annular recess portion.

In the vehicle seat disclosed in the specification, the first movable portion is formed in a bellows shape which can expand and contract in a front-rear direction, and the front chamber, the rear chamber, and the first movable portion are integrally formed.

In the vehicle seat disclosed in the specification, the chamber further includes a pair of side chambers disposed on both sides of the seat cushion and a pair of second movable portions which are respectively provided in portions between the rear chamber and the side chambers and allow the rear chamber to sink with regard to the pair of side chambers.

In the vehicle seat disclosed in the specification, the rear chamber and the side chambers are formed separately and respectively includes fitting portions which fit to each other, and the second movable portion is constituted by the fitting portion of the rear chamber and the fitting portion of the side chamber, and further in a cross section perpendicular to a width direction of the seat cushion, the fitting portion of the rear chamber and the fitting portion of the side chamber are formed in a fan shape, and still further the fitting portion of the rear chamber is pivotable about a center of the fan shape with respect to the fitting portion of the side chamber.

In the vehicle seat disclosed in the specification, between the fitting portion of the rear chamber and the fitting portion of the side chamber, one fitting portion arranged on the outside includes an annular recess portion and the other fitting portion includes an annular convex portion which engages with the annular recess portion.

In the vehicle seat disclosed in the specification, the second movable portion is formed in a bellows shape which can expand and contract in an up-down direction and the rear chamber, the pair of side chambers, and the pair of second movable portions are integrally formed.

What is claimed is:

1. A vehicle seat, comprising:
    a chamber in which at least a seat-front-surface side is covered with a pad and which circulates the air blown from a front surface of a seat through the pad;
    a fan configured to send air into the chamber; and
    a support body which supports the chamber so as to be able to sink in an acting direction of a load applied to the surface of the seat, wherein:
    the chamber includes a first region and a second region;
    the first region and the second region are configured to allow subduction of the chamber independently of each other;
    the support body includes:
        a front frame disposed below the pad and the chamber on a front side of the seat cushion; and
        a plurality of springs disposed below the pad and the chamber on a rear side of the seat cushion;
    the first region is a front chamber disposed on the front side of the seat cushion;
    the second region is a rear chamber disposed on the rear side of the seat cushion; and
    a first movable portion which is provided between the front chamber and the rear chamber and allows the rear chamber to sink with regard to the front chamber.

2. The vehicle seat according to claim 1, wherein:
    the front chamber and the rear chamber are formed separately and respectively includes fitting portions which fit to each other;
    the first movable portion is constituted by the fitting portion of the front chamber and the fitting portion of the rear chamber;
    in a cross section perpendicular to a width direction of the seat cushion, the fitting portion of the front chamber and the fitting portion of the rear chamber are formed in a fan shape; and
    the fitting portion of the rear chamber is pivotable about a center of the fan shape with respect to the fitting portion of the front chamber.

3. The vehicle seat according to claim 2, wherein:
    one fitting portion, of the fitting portion of the front chamber and the fitting portion of the rear chamber, arranged on the outside includes an annular recess portion, and the other fitting portion includes an annular convex portion which engages with the annular recess portion.

4. The vehicle seat according to claim 1, wherein:
    the first movable portion is formed in a bellows shape which is configured to expand and contract in a front-rear direction; and
    the front chamber, the rear chamber, and the first movable portion are integrally formed.

5. The vehicle seat according to claim 1, wherein the chamber further includes:
    a pair of side chambers disposed on both sides of the seat cushion; and
    a pair of second movable portions which are respectively provided between the rear chamber and the side chambers and allow the rear chamber to sink with respect to the pair of side chambers.

6. The vehicle seat according to claim 5, wherein:
    the rear chamber and the side chambers are formed separately and respectively fitting portions which fit to each other;
    the second movable portion is constituted by the fitting portion of the rear chamber and the fitting portion of the side chamber;
    in a cross section perpendicular to a width direction of the seat cushion, the fitting portion of the rear chamber and the fitting portion of the side chamber are formed in a fan shape; and
    the fitting portion of the rear chamber is pivotable about a center of the fan shape with respect to the fitting portion of the side chamber.

7. The vehicle seat according to claim 6, wherein between the fitting portion of the rear chamber and the fitting portion of the side chamber, one fitting portion arranged on the outside includes an annular recess portion and the other fitting portion includes an annular convex portion which engages with the annular recess portion.

8. The vehicle seat according to claim 5, wherein:
    the second movable portion is formed in a bellows shape which is configured to expand and contract in an up-down direction; and
    the rear chamber, the pair of side chambers, and the pair of second movable portions are integrally formed.

* * * * *